(12) United States Patent
Jain et al.

(10) Patent No.: US 9,332,363 B2
(45) Date of Patent: May 3, 2016

(54) SYSTEM AND METHOD FOR DETERMINING METER PRESENCE UTILIZING AMBIENT FINGERPRINTS

(71) Applicant: The Nielsen Company (US), LLC, Schaumburg, IL (US)

(72) Inventors: Anand Jain, Ellicott City, MD (US); John Stavropoulos, Edison, NJ (US); Alan Neuhauser, Silver Spring, MD (US); Wendell Lynch, East Lansing, MI (US); Vladimir Kuznetsov, Ellicott City, MD (US); Jack Crystal, Owings Mills, MD (US); David Gish, Riverdale, NJ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 502 days.

(21) Appl. No.: 13/728,252

(22) Filed: Dec. 27, 2012

(65) Prior Publication Data
US 2013/0202128 A1    Aug. 8, 2013

Related U.S. Application Data

(63) Continuation-in-part of application No. 13/341,453, filed on Dec. 30, 2011, now abandoned.

(51) Int. Cl.
| H04H 60/33 | (2008.01) |
| H04R 29/00 | (2006.01) |
| G06Q 30/02 | (2012.01) |

(52) U.S. Cl.
CPC ............ *H04R 29/00* (2013.01); *G06Q 30/0201* (2013.01); *G06Q 30/02* (2013.01)

(58) Field of Classification Search
CPC .............. G06Q 30/02; G06Q 30/0203; G06Q 30/0201; G08B 13/1427; H04M 1/72569; H04R 29/00; G11B 3/46; G11B 3/445; H04H 20/31; H04H 60/58; G10L 15/00; G10L 19/018

USPC ............ 381/58, 76, 60, 59; 345/169; 725/12, 725/18, 19, 9, 22, 14, 23, 10; 340/905; 455/517

See application file for complete search history.

(56) References Cited

U.S. PATENT DOCUMENTS

| 4,107,734 A | 8/1978 | Percy et al. |
| 4,107,735 A | 8/1978 | Frohbach |

(Continued)

FOREIGN PATENT DOCUMENTS

| CA | 2033558 | 9/1991 |
| CA | 2658979 | 1/2008 |

(Continued)

OTHER PUBLICATIONS

Canadian Intellectual Property Office, "Office Action," issued in connection with Application No. 2,658,979, Jul. 31, 2014, 2 pages.

(Continued)

*Primary Examiner* — Vivian Chin
*Assistant Examiner* — Ubachukwu Odunukwe
(74) *Attorney, Agent, or Firm* — Hanley, Flight & Zimmerman, LLC

(57) ABSTRACT

Systems and methods are disclosed for providing portable device presence utilizing environmental ambient audio fingerprints. Portable devices provide media exposure data and environmental ambient fingerprints to a processing device, where the environmental ambient signatures provide at least one characteristic of the ambient audio surrounding each portable device. The environmental ambient signatures are then processed to determine if they match. Portable devices associated with matching signatures are identified. Ambient fingerprints may also be used to establish a logical location where media exposure took place. The ambient signatures are alternately combined with monitored data to provide more robust data sets for contextual processing.

20 Claims, 9 Drawing Sheets

| User | Media | Prog. | Start Time | End Time | Amb. Sig. | Authenticated | Battery | App | |
|---|---|---|---|---|---|---|---|---|---|
| 1234 | WABC | X Show | 08:45:32 | 08:50:11 | Room1 | Y | 85% | --- | ← 619 |
| 1234 | WABC | Y Show | 08:50:11 | 09:10:30 | Room2 | Y | 83% | --- | ← 620 |
| 1234 | Fox | Z Show | 09:24:20 | 09:45:20 | Room3 | Y | 80% | ... | ← 621 |
| 1234 | Fox.com | WWW | 09:50:00 | 10:58:43 | Room4 | N | 75% | Opera Mini | ← 622 |
| 1234 | CNN.com | WWW | 11:06:20 | 11:06:20 | --- | N | 68% | Opera Mini | ← 623 |

610  611  612  613  614  615  616  617  618

(56) References Cited

U.S. PATENT DOCUMENTS

| | | |
|---|---|---|
| 4,258,386 A | 3/1981 | Cheung |
| 4,308,554 A | 12/1981 | Percy et al. |
| 4,567,511 A | 1/1986 | Smith et al. |
| 4,584,602 A | 4/1986 | Nakagawa |
| 4,626,904 A | 12/1986 | Lurie |
| 4,642,685 A | 2/1987 | Roberts et al. |
| 4,646,145 A | 2/1987 | Percy et al. |
| 4,652,915 A | 3/1987 | Heller, III |
| 4,658,290 A | 4/1987 | McKenna |
| 4,695,879 A | 9/1987 | Weinblatt |
| 4,697,209 A | 9/1987 | Kiewit et al. |
| 4,718,106 A | 1/1988 | Weinblatt |
| 4,779,198 A | 10/1988 | Lurie |
| 4,803,625 A | 2/1989 | Fu et al. |
| 4,907,079 A | 3/1990 | Turner et al. |
| 4,912,552 A | 3/1990 | Allison, III et al. |
| 4,955,070 A | 9/1990 | Welsh et al. |
| 4,973,952 A | 11/1990 | Malec et al. |
| 5,023,929 A | 6/1991 | Call |
| 5,155,762 A | 10/1992 | Croquet et al. |
| 5,483,276 A | 1/1996 | Brooks et al. |
| 5,579,124 A | 11/1996 | Aijala et al. |
| 5,704,029 A | 12/1997 | Wright, Jr. |
| 5,822,744 A | 10/1998 | Kesel |
| 5,864,708 A | 1/1999 | Croft et al. |
| 6,026,387 A | 2/2000 | Kesel |
| 6,271,631 B1 | 8/2001 | Burrows |
| 6,294,999 B1 | 9/2001 | Yarin et al. |
| 6,380,928 B1 | 4/2002 | Todd |
| 6,456,981 B1 | 9/2002 | Dejaeger et al. |
| 6,467,089 B1 | 10/2002 | Aust et al. |
| 6,564,104 B2 | 5/2003 | Nelson et al. |
| 6,572,560 B1 | 6/2003 | Watrous et al. |
| 6,574,614 B1 | 6/2003 | Kesel |
| 6,623,427 B2 | 9/2003 | Mandigo |
| 6,661,438 B1 | 12/2003 | Shiraishi et al. |
| 6,754,470 B2 | 6/2004 | Hendrickson et al. |
| 6,757,719 B1 | 6/2004 | Lightman et al. |
| 6,893,396 B2 | 5/2005 | Schulze et al. |
| 6,963,848 B1 | 11/2005 | Brinkerhoff |
| 7,020,082 B2 | 3/2006 | Bhagavath et al. |
| 7,065,351 B2 | 6/2006 | Carter et al. |
| 7,162,202 B2 | 1/2007 | Westman |
| 7,263,086 B2 | 8/2007 | Viikari et al. |
| 7,363,214 B2 | 4/2008 | Musgrove et al. |
| 7,493,388 B2 | 2/2009 | Wen et al. |
| 7,555,470 B2 | 6/2009 | Brown |
| 7,616,110 B2 | 11/2009 | Crump et al. |
| 8,830,792 B2 | 9/2014 | Taylor et al. |
| 2001/0000668 A1 | 5/2001 | Bodnar |
| 2001/0032115 A1 | 10/2001 | Goldstein |
| 2001/0037206 A1 | 11/2001 | Falk et al. |
| 2002/0019584 A1 | 2/2002 | Schulze et al. |
| 2002/0026348 A1 | 2/2002 | Fowler et al. |
| 2002/0045519 A1 | 4/2002 | Watterson et al. |
| 2002/0082771 A1 | 6/2002 | Anderson |
| 2002/0138848 A1 | 9/2002 | Alao et al. |
| 2002/0143563 A1 | 10/2002 | Hufford et al. |
| 2002/0143577 A1 | 10/2002 | Shiffman et al. |
| 2002/0181711 A1 | 12/2002 | Logan et al. |
| 2002/0188652 A1 | 12/2002 | Goldhaber et al. |
| 2002/0198990 A1 | 12/2002 | Bradfield et al. |
| 2003/0006911 A1 | 1/2003 | Smith et al. |
| 2003/0032409 A1 | 2/2003 | Hutchenson et al. |
| 2003/0036683 A1 | 2/2003 | Kehr et al. |
| 2003/0086341 A1 | 5/2003 | Wells et al. |
| 2003/0126250 A1 | 7/2003 | Jhanji |
| 2003/0171833 A1 | 9/2003 | Crystal et al. |
| 2004/0005900 A1 | 1/2004 | Zilliacus |
| 2004/0006478 A1 | 1/2004 | Alpdemir et al. |
| 2004/0010418 A1 | 1/2004 | Buonocore et al. |
| 2004/0078214 A1 | 4/2004 | Speiser et al. |
| 2004/0095897 A1 | 5/2004 | Vafaei |
| 2004/0109061 A1 | 6/2004 | Walker et al. |
| 2004/0192299 A1 | 9/2004 | Wilson et al. |
| 2004/0209595 A1 | 10/2004 | Bekanich |
| 2004/0235460 A1 | 11/2004 | Engstrom et al. |
| 2004/0243468 A1 | 12/2004 | Cohagan et al. |
| 2004/0252816 A1 | 12/2004 | Nicolas |
| 2004/0255322 A1 | 12/2004 | Meadows et al. |
| 2005/0120389 A1 | 6/2005 | Boss |
| 2005/0144632 A1 | 6/2005 | Mears et al. |
| 2005/0172021 A1 | 8/2005 | Brown |
| 2005/0197988 A1 | 9/2005 | Bublitz |
| 2005/0203800 A1 | 9/2005 | Sweeney et al. |
| 2005/0213511 A1 | 9/2005 | Reece, Jr. et al. |
| 2005/0216509 A1 | 9/2005 | Kolessar et al. |
| 2005/0228718 A1 | 10/2005 | Austin |
| 2005/0234309 A1 | 10/2005 | Klapper |
| 2005/0234774 A1 | 10/2005 | Dupree |
| 2005/0250470 A1 | 11/2005 | Wen et al. |
| 2005/0268798 A1 | 12/2005 | Neuhauser et al. |
| 2006/0041657 A1 | 2/2006 | Wen et al. |
| 2006/0095331 A1 | 5/2006 | O'Malley et al. |
| 2006/0101116 A1 | 5/2006 | Rittman et al. |
| 2006/0154642 A1 | 7/2006 | Scannell, Jr. |
| 2006/0184493 A1 | 8/2006 | Shiffman et al. |
| 2006/0218034 A1 | 9/2006 | Kelly |
| 2006/0235764 A1 | 10/2006 | Bamborough et al. |
| 2006/0293802 A1 | 12/2006 | Kitao et al. |
| 2006/0294108 A1 | 12/2006 | Adelson et al. |
| 2007/0138251 A1 | 6/2007 | Mattlin et al. |
| 2007/0288277 A1 | 12/2007 | Neuhauser |
| 2007/0288476 A1 | 12/2007 | Flanagan |
| 2007/0294057 A1 | 12/2007 | Crystal et al. |
| 2007/0294706 A1 | 12/2007 | Neuhauser |
| 2008/0059988 A1* | 3/2008 | Lee et al. ............... 725/9 |
| 2008/0071786 A1 | 3/2008 | Swanburg et al. |
| 2008/0086533 A1 | 4/2008 | Neuhauser |
| 2008/0091087 A1 | 4/2008 | Neuhauser |
| 2008/0091451 A1 | 4/2008 | Crystal et al. |
| 2008/0091762 A1 | 4/2008 | Neuhauser et al. |
| 2008/0109295 A1 | 5/2008 | McConochie |
| 2008/0204082 A1 | 8/2008 | Crystal |
| 2009/0085873 A1* | 4/2009 | Betts et al. ............... 345/169 |
| 2009/0171767 A1 | 7/2009 | Kolessar |
| 2009/0193052 A1 | 7/2009 | Fitzgerald |
| 2010/0077420 A1 | 3/2010 | Nielsen et al. |
| 2010/0102981 A1 | 4/2010 | Nielsen et al. |
| 2012/0011528 A1 | 1/2012 | Nielsen et al. |
| 2012/0155662 A1* | 6/2012 | Tawada ............... 381/58 |
| 2012/0173701 A1 | 7/2012 | Tenbrock |
| 2012/0245978 A1 | 9/2012 | Jain et al. |
| 2012/0278377 A1 | 11/2012 | Weissman |

FOREIGN PATENT DOCUMENTS

| | | |
|---|---|---|
| CA | 2659240 | 1/2008 |
| CA | 2659244 | 1/2008 |
| CA | 2659277 | 1/2008 |
| CN | 1324193 | 11/2001 |
| CN | 1643886 | 7/2005 |
| CN | 1649426 | 8/2005 |
| CN | 1717694 A | 1/2006 |
| JP | 2120987 | 5/1990 |
| JP | 2298185 | 12/1990 |
| JP | 3035407 | 2/1991 |
| JP | 3095403 | 5/1991 |
| JP | 3035408 | 12/1993 |
| JP | 3447333 | 3/1995 |
| JP | 9510843 | 9/1995 |
| JP | 3607725 | 2/1996 |
| JP | 3611880 | 2/1996 |
| JP | 11501177 | 9/1996 |
| JP | 2939429 | 2/1997 |
| JP | 3688764 | 2/1997 |
| JP | 3974953 | 2/1997 |
| JP | 3574241 | 5/1997 |
| JP | 3631541 | 6/1997 |
| JP | 3643157 | 6/1997 |
| JP | 2000505618 | 8/1997 |
| JP | 3535522 | 12/1997 |
| JP | 2001502130 | 3/1998 |
| JP | 3625344 | 5/1998 |

(56) References Cited

FOREIGN PATENT DOCUMENTS

| | | |
|---|---|---|
| JP | 3688833 | 6/1998 |
| JP | 2002505019 | 6/1998 |
| JP | 3919233 | 7/1998 |
| JP | 3737614 | 4/1999 |
| JP | 11122203 | 4/1999 |
| JP | 2001524776 | 6/1999 |
| JP | 2001527320 | 7/1999 |
| JP | 3749787 | 10/1999 |
| JP | 3964041 | 10/1999 |
| JP | 3964979 | 10/1999 |
| JP | 2002515684 | 11/1999 |
| JP | 4034879 | 12/1999 |
| JP | 4030036 | 1/2000 |
| JP | 3688903 | 3/2000 |
| JP | 2001188703 | 7/2001 |
| JP | 2001324988 | 11/2001 |
| JP | 2002041578 | 2/2002 |
| JP | 2002044689 | 2/2002 |
| JP | 2002092504 | 3/2002 |
| JP | 2002117217 | 4/2002 |
| JP | 2002133283 | 5/2002 |
| JP | 2002135757 | 5/2002 |
| JP | 4224201 | 6/2002 |
| JP | 3546021 | 8/2002 |
| JP | 2002236776 | 8/2002 |
| JP | 2002245192 | 8/2002 |
| JP | 2002304185 | 10/2002 |
| JP | 2002318874 | 10/2002 |
| JP | 2002532952 | 10/2002 |
| JP | 2002354507 | 12/2002 |
| JP | 2003500980 | 1/2003 |
| JP | 2003058688 | 2/2003 |
| JP | 4119130 | 7/2003 |
| JP | 2003331106 | 11/2003 |
| JP | 200421778 | 1/2004 |
| JP | 2004013472 | 1/2004 |
| JP | 2004040822 | 2/2004 |
| JP | 3512419 | 3/2004 |
| JP | 2004102651 | 4/2004 |
| JP | 3699953 | 5/2004 |
| JP | 2004026529 | 7/2004 |
| JP | 2003530763 | 10/2004 |
| JP | 2004536477 | 12/2004 |
| JP | 2004536501 | 12/2004 |
| JP | 2005085207 | 3/2005 |
| JP | 2005130351 | 5/2005 |
| JP | 2005515669 | 5/2005 |
| JP | 2005525002 | 8/2005 |
| JP | 2005311739 | 11/2005 |
| JP | 4210241 | 12/2005 |
| JP | 2006505145 | 2/2006 |
| JP | 2006139354 | 6/2006 |
| JP | 4008929 | 9/2006 |
| JP | 2007088808 | 4/2007 |
| JP | 2007297146 | 11/2007 |
| JP | 2008009442 | 1/2008 |
| JP | 2008508529 | 3/2008 |
| JP | 2008508618 | 3/2008 |
| JP | 2008085767 | 4/2008 |
| JP | 2008276298 | 11/2008 |
| JP | 2009003736 | 1/2009 |
| JP | 2009507301 | 2/2009 |
| KR | 168860 | 10/1991 |
| KR | 19930006664 | 7/1993 |
| KR | 19930006665 | 7/1993 |
| KR | 20010039360 | 5/2001 |
| KR | 20020021695 | 3/2002 |
| KR | 20030063640 | 7/2003 |
| KR | 20040104195 | 12/2004 |
| KR | 20050026920 | 3/2005 |
| KR | 20050044398 | 5/2005 |
| KR | 20050058296 | 6/2005 |
| KR | 20050083808 | 8/2005 |
| KR | 20050106393 | 11/2005 |
| KR | 20060055347 | 5/2006 |
| KR | 20070039123 | 4/2007 |
| KR | 20090003450 | 4/2007 |
| KR | 20070051879 | 5/2007 |
| KR | 20070083528 | 8/2007 |
| KR | 20070083530 | 8/2007 |
| KR | 20070112412 | 11/2007 |
| KR | 20080034048 | 4/2008 |
| KR | 20080045258 | 5/2008 |
| KR | 20080059587 | 6/2008 |
| KR | 20080064176 | 7/2008 |
| WO | 9111062 | 7/1991 |
| WO | 9307689 | 4/1993 |
| WO | WO 0067471 | 9/2000 |
| WO | WO 0219070 | 3/2002 |
| WO | WO 03044755 | 5/2003 |
| WO | WO 03053123 | 7/2003 |
| WO | WO 03060630 | 7/2003 |
| WO | WO 03071810 | 8/2003 |
| WO | WO 2004006110 | 1/2004 |
| WO | 2005038625 | 4/2005 |

OTHER PUBLICATIONS

United States Patent and Trademark Office, "Final Office Action," issued in connection with U.S. Appl. No. 11/777,012, Oct. 1, 2014, 33 pages.

United States Patent and Trademark Office, "Final Office Action," issued in connection with U.S. Appl. No. 13/341,113, Oct. 10, 2014, 33 pages.

Korean Intellectual Property Office, "Final Rejection," issued in connection with Application No. 10-2009-7002931, Oct. 10, 2014, 3 pages.

State Intellectual Property Office of People's Republic of China, "Second Office Action," issued in connection with Chinese Patent Application No. 201210166556.9 on Jul. 11, 2014 (10 pages).

IP Australia, "Notice of Acceptance," issued in connection with Application No. 2007272434, May 8, 2012 (2 pages).

IP Australia, "Patent Examination Report No. 1," issued in connection with Application No. 2007272434, Aug. 6, 2012 (4 pages).

Canadian Intellectual Property Office, "Office Action," issued in connection with Application No. 2,659,244, Aug. 22, 2014, 3 pages.

Canadian Intellectual Property Office, "Office Action," issued in connection with Application No. 2,659,277, Aug. 22, 2014, 3 pages.

United States Patent and Trademark Office, "Non-Final Office Action," issued in connection with U.S. Appl. No. 13/341,453, Sep. 25, 2014, 43 pages.

Korean Intellectual Property Office, "Final Rejection," issued in connection with Application No. 10-2009-7002929, Nov. 27, 2014, 4 pages.

United States Patent and Trademark Office, "Final Office Action," issued in connection with U.S. Appl. No. 11/776,987, Dec. 24, 2014, 61 pages.

Helgeson et al., "Determinants of Mail-Survey Response: Survey Design Factors and Respondent Factors," vol. 19 (3), Mar. 2002, 26 pages.

Fishkin et al, "Pervasive Computing," May 2006, 415 pages, 4th International Conference, Pervasive 2006, Dublin, Ireland.

European Patent Office, "Extended European Search Report," issued in connection with Application No. 07812862.6, Jul. 6, 2009, 5 pages.

European Patent Office, "Extended European Search Report," issued in connection with Application No. 07840400, Jul. 6, 2009, 5 pages.

European Patent Office, "Extended European Search Report," issued in connection with Application No. 07812865.9, Jul. 16, 2009, 6 pages.

Patent Cooperation Treaty, "International Preliminary Report on Patentability," issued in connection with Application No. PCT/US94/07746, Feb. 9, 1996, 4 pages.

Patent Cooperation Treaty, "International Preliminary Report on Patentability," issued in connection with Application No. PCT/US2007/073390, Jan. 13, 2009, 10 pages.

Patent Cooperation Treaty, "International Preliminary Report on Patentability," issued in connection with Application No. PCT/US2012/072276, Jul. 10, 2014, 6 pages.

Patent Cooperation Treaty, "Written Opinion and International Search Report," issued in connection with Application No. PCT/US2012/072276, Mar. 13, 2013, 6 pages.

(56) References Cited

OTHER PUBLICATIONS

Patent Cooperation Treaty, "International Search Report," issued in connection with Application No. PCT/US94/07746, Nov. 30, 1994, 4 pages.
Patent Cooperation Treaty, "International Search Report," issued in connection with Application No. PCT/US07/73390, Aug. 25, 2008, 1 pages.
Patent Cooperation Treaty, "International Search Report," issued in connection with Application No. PCT/US07/73393, Feb. 4, 2008, 3 pages.
Patent Cooperation Treaty, "International Search Report and Written Opinion," issued in connection with Application No. PCT/US07/73376, Sep. 9, 2008, 9 pages.
Patent Cooperation Treaty, "International Search Report and Written Opinion," issued in connection with Application No. PCT/US07/73383, Aug. 25, 2008, 9 pages.
Patent Cooperation Treaty, "International Search Report and Written Opinion," issued in connection with Application No. PCT/US07/73395, Aug. 8, 2008, 13 pages.
Japanese Patent Office, "Notice of Allowance," issued in connection with Application No. 2009-519700, Mar. 5, 2014, 6 pages.
Canadian Intellectual Property Office, "Office Action," issued in connection with Application No. 2,168,540, Jan. 20, 2004, 2 pages.
German Patent Office, "Office Action," issued in connection with Application No. 10084633.5-53, Oct. 14, 2002, 5 pages.
IP Australia, "Patent Examination Report No. 1," issued in connection with Application No. 2007272428, Aug. 1, 2012, 3 pages.
State Intellectual Property Office of the People's Republic of China, "Rejection Decision," issued in connection with Application No. 200780033751.1, Mar. 1, 2012, 10 pages.
Israel Patent Office, "Office Action," issued in connection with Application No. 196,435, Mar. 6, 2014, 3 pages.
Indian Patent Office, "First Examination Report," issued in connection with Application No. 577/KOLNP/2009, Jun. 2, 2014, 2 pages.
Korean Intellectual Property Office, "Office Action," issued in connection with Application 10-2009-7002931, Apr. 23, 2014, 6 pages.
Mexican Patent Office, "Office Action," issued in connection with Application No. MX/a/2009/000468, Dec. 26, 2013, 4 pages.
IP Australia, "Patent Examination Report No. 1," issued in connection with Application No. 2007272440, Aug. 1, 2012, 3 pages.
State Intellectual Property Office of the People's Republic of China, "First Office Action," issued in connection with Application No. 200780033681.X, Jun. 24, 2011, 14 pages.
State Intellectual Property Office of the People's Republic of China, "First Office Action," issued in connection with Application No. 201210166556.9, Oct. 28, 2013, 17 pages.
Israel Patent Office, "Office Action," issued in connection with Application No. 196,433, Mar. 18, 2014, 2 pages.
Indian Patent Office, "First Examination Report," issued in connection with Application No. 573/KOLNP/2009, Jun. 2, 2014, 2 pages.
Indian Patent Office, "First Examination Report," issued in connection with Application No. 576/KOLNP/2009, Jun. 10, 2014, 2 pages.
Korean Intellectual Property Office, "Office Action," issued in connection with Application No. 10-2009-7002929, May 14, 2014, 5 pages.
Mexican Patent Office, "Office Action," issued in connection with Application No. MX/a/2009/000469, Jan. 3, 2014, 3 pages.
IP Australia, "Patent Examination Report No. 1," issued in connection with Application No. 2007272442, Aug. 1, 2012, 3 pages.
Israel Patent Office, "Office Action," issued in connection with Application No. 196,434, Apr. 6, 2014, 3 pages.
Indian Patent Office, "Office Action," issued in connection with Application No. 575/KOLNP/2009, Jun. 2, 2014, 2 pages.
Japanese Patent Office, "Notice of Reasons for Rejection," issued in connection with Application No. 2009-519700, Apr. 16, 2013, 5 pages.
Japanese Patent Office, "Notice of Reasons for Rejection," issued in connection with Application No. 2009-519700, Nov. 5, 2013, 4 pages.
Korean Intellectual Property Office, "Office Action," issued in connection with Application No. 10-2009-7002934, Oct. 16, 2013, 2 pages.
Korean Intellectual Property Office, "Office Action," issued in connection with Application No. 10-2009-7002934, May 2, 2014, 2 pages.
Mexican Patent Office, "Office Action," issued in connection with Application No. MX/z/2009/000467, Jan. 3, 2014, 5 pages.
Indian Patent Office, "Office Action," issued in connection with Application No. 574/KOLNP/2009, Jun. 2, 2014, 2 pages.
Patent Cooperation Treaty, "Written Opinion," issued in connection with Application No. PCT/US94/07746, Aug. 17, 1995, 4 pages.
Patent Cooperation Treaty, "Written Opinion," issued in connection with Application No. PCT/US07/73390, Aug. 25, 2008, 9 pages.
IP Australia, "Patent Examination Report No. 1," issued in connection with Application No. 2007272444, Dec. 24, 2012, 4 pages.
United States Patent and Trademark Office, "Examiner's Answer" issued in connection with U.S. Appl. No. 11/776,940 on Nov. 14, 20122 (13 pages).
United States Patent and Trademark Office, "Advisory Action" issued in connection with U.S. Appl. No. 11/776,940 on Oct. 7, 2010 (3 pages).
United States Patent and Trademark Office, "Final Office Action" issued in connection with U.S. Appl. No. 11/776,940 on Jul. 20, 2010 (10 pages).
United States Patent and Trademark Office, "Non-Final Office Action" issued in connection with U.S. Appl. No. 11/776,940 on Oct. 9, 2009 (9 pages).
United States Patent and Trademark Office, "Advisory Action" issued in connection with U.S. Appl. No. 11/776,940 on Jul. 9, 2009 (5 pages).
United States Patent and Trademark Office, "Final Office Action" issued in connection with U.S. Appl. No. 11/776,940 on Apr. 21, 2009 (8 pages).
United States Patent and Trademark Office, "Non-Final Office Action" issued in connection with U.S. Appl. No. 11/776,940 on Aug. 6, 2008 (7 pages).
United States Patent and Trademark Office, "Final Office Action" issued in connection with U.S. Appl. No. 11/777,030 on Dec. 26, 2013 (20 pages).
United States Patent and Trademark Office, "Final Office Action" issued in connection with U.S. Appl. No. 11/777,030 on Feb. 28, 2011 (26 pages).
United States Patent and Trademark Office, "Non-Final Office Action" issued in connection with U.S. Appl. No. 11/777,030 on Sep. 20, 2010 (10 pages).
United States Patent and Trademark Office, "Examiner's Answer" issued in connection with U.S. Appl. No. 11/777,051 on Aug. 2, 2012 (15 pages).
United States Patent and Trademark Office, "Advisory Action" issued in connection with U.S. Appl. No. 11/777,051 on Sep. 26, 2011 (3 pages).
United States Patent and Trademark Office, "Final Office Action" issued in connection with U.S. Appl. No. 11/777,051 on Jul. 1, 2011 (11 pages).
United States Patent and Trademark Office, "Non-Final Office Action" issued in connection with U.S. Appl. No. 11/777,051 on Nov. 15, 2010 (8 pages).
United States Patent and Trademark Office, "Advisory Action" issued in connection with U.S. Appl. No. 11/777,051 on Jul. 15, 2010 (3 pages).
United States Patent and Trademark Office, "Final Office Action" issued in connection with U.S. Appl. No. 11/777,051 on Apr. 30, 2010 (9 pages).
United States Patent and Trademark Office, "Non-Final Office Action" issued in connection with U.S. Appl. No. 11/777,051 on Jul. 14, 2009 (11 pages).
United States Patent and Trademark Office, "Restriction Requirement" issued in connection with U.S. Appl. No. 11/777,051 on Mar. 23, 2009 (10 pages).
United States Patent and Trademark Office, "Final Office Action" issued in connection with U.S. Appl. No. 13/341,113 on Jun. 24, 2014 (14 pages).
United States Patent and Trademark Office, "Non-Final Office Action" issued in connection with U.S. Appl. No. 13/341,113 on Jan. 31, 2014 (10 pages).
United States Patent and Trademark Office, "Non-Final Office Action" issued in connection with U.S. Appl. No. 11/777,012 on Apr. 23, 2014 (9 pages).

(56) References Cited

OTHER PUBLICATIONS

United States Patent and Trademark Office, "Final Office Action" issued in connection with U.S. Appl. No. 11/777,012 on Jul. 15, 2013 (15 pages).
United States Patent and Trademark Office, "Non-Final Office Action" issued in connection with U.S. Appl. No. 11/777,012 on Feb. 1, 2013 (14 pages).
United States Patent and Trademark Office, "Final Office Action" issued in connection with U.S. Appl. No. 11/777,012 on Jun. 23, 2011 (14 pages).
United States Patent and Trademark Office, "Non-Final Office Action" issued in connection with U.S. Appl. No. 11/777,012 on Dec. 27, 2010 (12 pages).
United States Patent and Trademark Office, "Final Office Action" issued in connection with U.S. Appl. No. 11/777,012 on Feb. 1, 2010 (13 pages).
United States Patent and Trademark Office, "Non-Final Office Action" issued in connection with U.S. Appl. No. 11/777,012 on Jul. 8, 2009 (12 pages).
United States Patent and Trademark Office, "Restriction Requirement" issued in connection with U.S. Appl. No. 11/776,987 on Aug. 5, 2008 (7 pages).
United States Patent and Trademark Office, "Non-Final Office Action" issued in connection with U.S. Appl. No. 11/776,987 on Nov. 28, 2008 (11 pages).
United States Patent and Trademark Office, "Final Office Action" issued in connection with U.S. Appl. No. 11/776,987 on Apr. 15, 2009 (13 pages).
United States Patent and Trademark Office, "Non-Final Office action" issued in connection with U.S. Appl. No. 11/776,987 on Aug. 10, 2009 (9 pages).
United States Patent and Trademark Office, "Final Office Action" issued in connection with U.S. Appl. No. 11/776,987 on Feb. 22, 2010 (11 pages).
United States Patent and Trademark Office, "Non-Final Office Action" issued in connection with U.S. Appl. No. 11/776,987 on Aug. 12, 2010 (11 pages).
United States Patent and Trademark Office, "Final Office Action" issued in connection with U.S. Appl. No. 11/776,987 on Dec. 22, 2010 (14 pages).
United States Patent and Trademark Office, "Non-Final Office Action" issued in connection with U.S. Appl. No. 11/776,987 on Apr. 14, 2011 (13 pages).
United States Patent and Trademark Office, "Final Office Action" issued in connection with U.S. Appl. No. 11/776,987 on Oct. 6, 2011 (14 pages).
United States Patent and Trademark Office, "Advisory Action" issued in connection with U.S. Appl. No. 11/776,987 on Jan. 12, 2012 (3 pages).
United States Patent and Trademark Office, "Non-Final Office Action" issued in connection with U.S. Appl. No. 11/776,987 on Dec. 31, 2013 (13 pages).
United States Patent and Trademark Office, "Decision on Appeal," issued in connection with U.S. Appl. No. 11/776,940, Dec. 12, 2014, 11 pages.
State Intellectual Property Office of the People's Republic of China, "Rejection Decision," issued in connection with Application No. 200780033751.1, Nov. 26, 2014, 9 pages.
Int'l Search Report & Written Opinion of PCT/US2012/72276 dated Mar. 13, 2013.
Fitzgerald, "Evaluating Return on Investment of Multimedia Advertising with a Single-Source Panel: A Retail Case Study", In: Journal of Advertising Research, pp. 262-270, Published Sep. 2004 [online] [retrieved on Feb. 7, 2013] retrieved from the internet, http://data.adic.co.kr/lit/publication/tmp/A9001258/A9001258.pdf>.
Pellegrini, "Listen without prejudice" In: Vue magazine, pp. 1-6, published Jun. 2005 [online] [retrieved Feb. 7, 2013] retrieved from the internet, http://wargood.arbitron.com/downloads/Vue_Pelligrini_June_05.pdf.

Hossain et al., "A Comprehensive Study of Bluetooth Signal Parameters for Localization" The $18^{th}$ Annual IEEE Int'l Symposium on Personal, Indoor and Mobile Radio Communications; 5 pages, published 2007.
Azizyan et al., "SurroundSense: Mobile Phone Localization via Ambience Fingerprinting" MobiCom '09, 12 pages, published Sep. 2009.
Bellettini et al., "A Framework for Robust Audio Fingerprinting" Journal of Communications, vol. 5, No. 5, pp. 409-424, published May 2010.
Lau et al., "Enhanced RSSI-Based High Accuracy Real-Time User Location Tracking System for Indoor and Outdoor Environments" Int'l Journal on Smart Sensing and Intelligent Systems, vol. 1, No. 2, pp. 534-548, published Jun. 2008.
Pei et al., "Using Inquiry-Based Bluetooth RSSI Probability Distributions for Indoor Positioning" Journal of Global Positioning Systems, vol. 9, No. 2, pp. 122-130, published 2010.
"Implementing location based information/advertising for existing mobile phone users in . . . ", O Rashid, P Coulton, R Edwards—Mobile Business, 2005, ICMB 2005, International . . . , 2005—ieeexplore.ieee.org.
A survey of mobility management in next-generation all-IP based wireless systems gatech.edu [PDF] IF Akyildiz, J Xie, S Mohanty—IEEE Wireless Communications, 2004—ieeexplore.ieee.org.
Location-based Services in the tourist industry, S Berger, H Lehmann, F Lehner—Information Technology & Tourism, 2003—tourism.wu-wien.ac.at.
Matching User's Semantics with Data Semantics in Location-Based Services, S Yu, L Al-Jadir, S Spaccapietra—$1^{st}$ Workshop on Semantics in Mobile Environments—lbdsun.epfl.ch.
Extended European Search Report for European Application No. 07812860, mailed Jul. 6, 2009.
Canadian Intellectual Property Office, "Office Action," issued in connection with Application No. 2,659,277, Jul. 9, 2015, 5 pages.
United States Patent and Trademark Office, "Advisory Action," issued in connection with U.S. Appl. No. 11/777,012, Mar. 4, 2015, 17 pages.
Mexican Industrial Property Institute, "Notice of Allowance," issued in connection with Application No. MX/a/2009/000469, Mar. 5, 2015, 2 pages.
State Intellectual Property Office of the People's Republic of China, "Second Office Action," issued in connection with Application No. 200780033751.1, Mar. 25, 2015, 27 pages.
State Intellectual Property Office of the People's Republic of China, "Third Office Action," issued in connection with Application No. 201210166556.9, Apr. 8, 2015, 9 pages.
IP Australia, "Patent Examination Report No. 1," issued in connection with Application No. 2014202095, May 25, 2015, 3 pages.
Korean Intellectual Property Office, "Final Rejection," issued in connection with Application No. 10-2009-7002929, May 22, 2015, 5 pages.
Canadian Intellectual Property Office, "Office Action," issued in connection with Application No. 2,659,244, May 20, 2015, 5 pages.
Israel Patent Office, "Office Action," issued in connection with Application No. 196,433, Jun. 3, 2015, 4 pages.
United States Patent and Trademark Office, "Final Office Action," issued in connection with U.S. Appl. No. 13/341,113, May 13, 2015, 42 pages.
United States Patent and Trademark Office, "Decision on Appeal," issued in connection with U.S. Appl. No. 11/777,051, Aug. 26, 2015, 8 pages.
United States Patent and Trademark Office, "Advisory Action," issued in connection with U.S. Appl. No. 13/341,113, Aug. 27, 2015, 5 pages.
State Intellectual Property Office, Office Action, issued in connection with Application No. 201310263540.4, Nov. 3, 2015, 11 pages.

\* cited by examiner

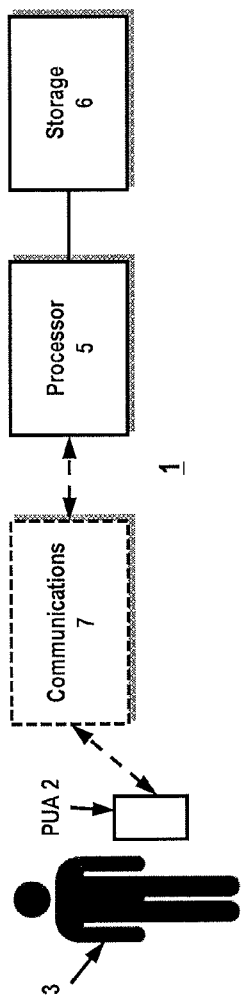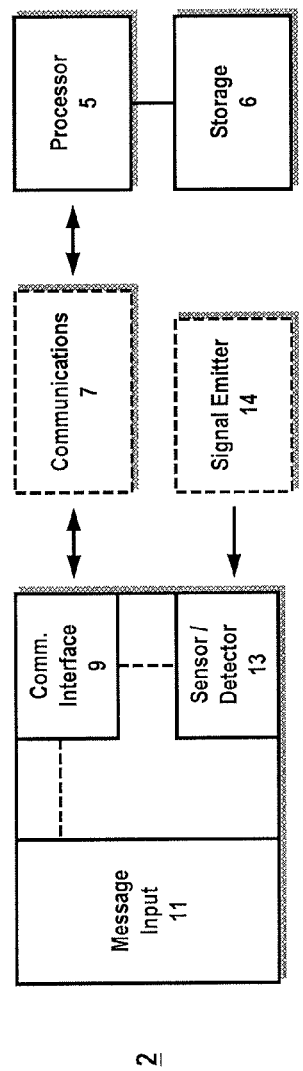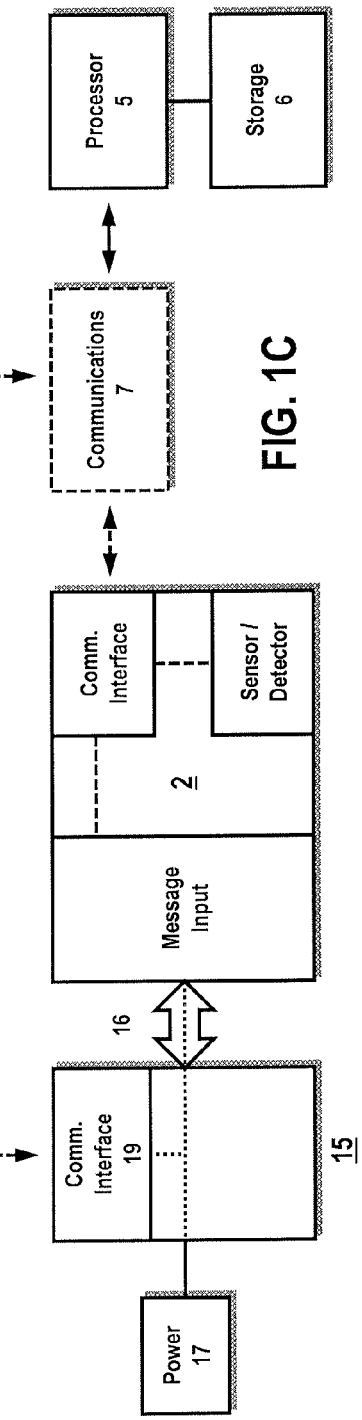

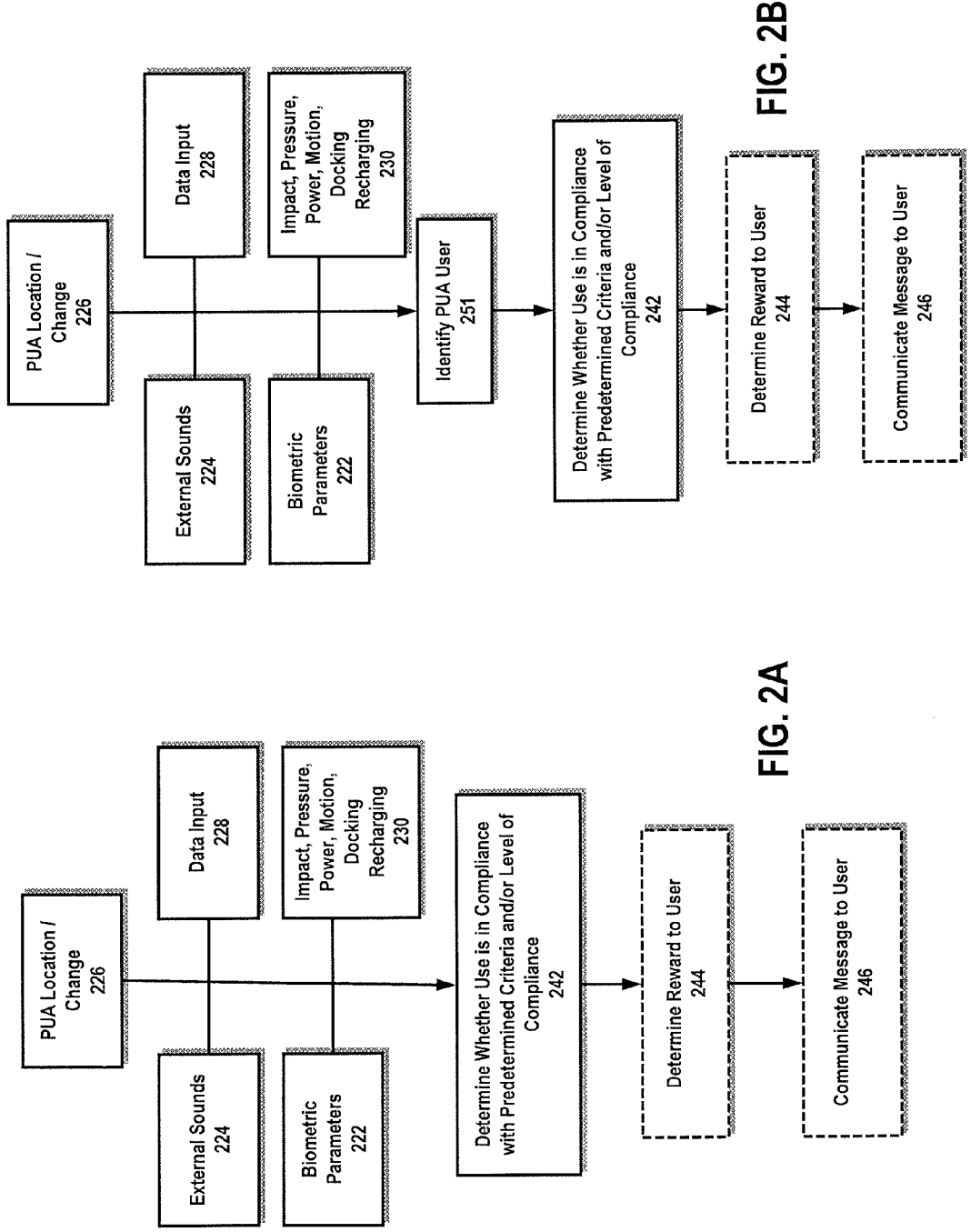

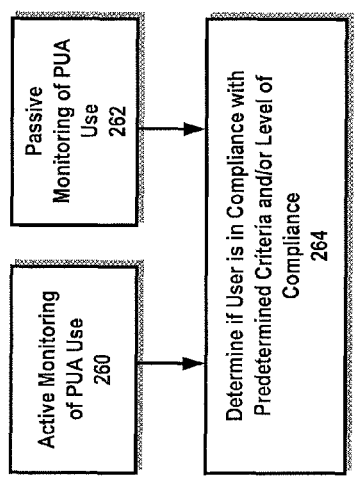
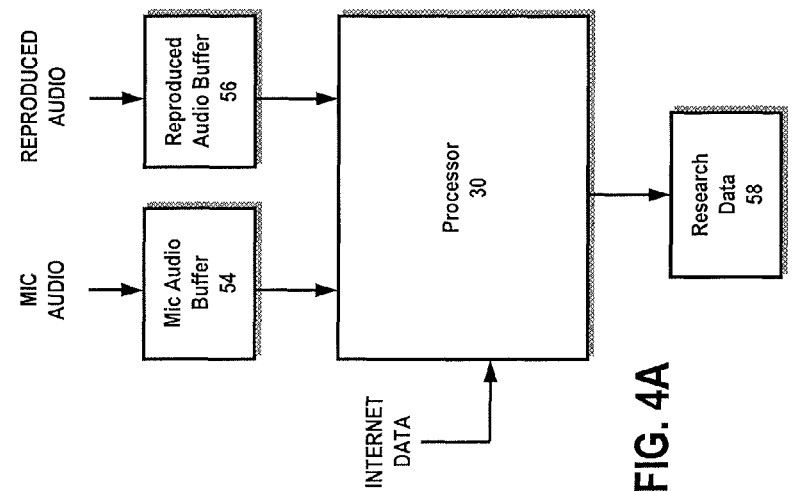
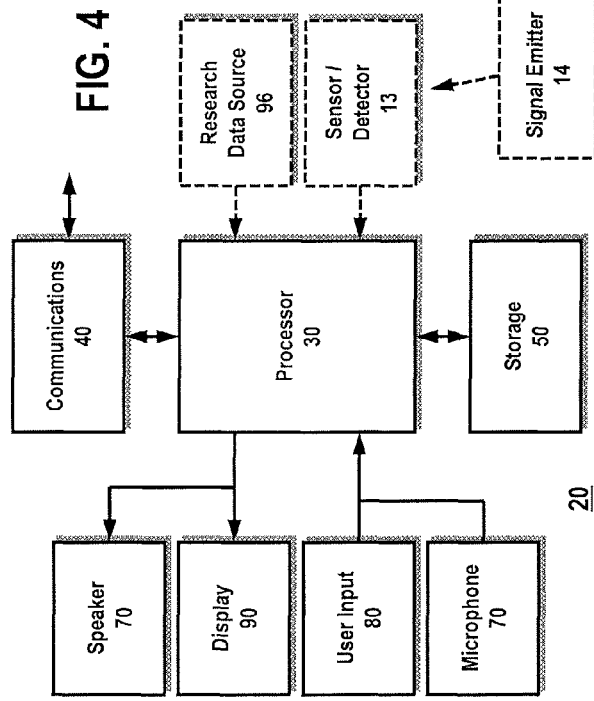

| User ID | 11:00 | 11:05 | 11:10 | 11:15 | 11:20 | 11:25 | 11:30 |
|---|---|---|---|---|---|---|---|
| User 1 | Room1 | Room1 | Room4 | Room4 | Room4 | ... | ... |
| User 2 | Room1 | Room1 | Room1 | Room1 | Room1 | ... | Room3 |
| User 3 | Room2 | Room2 | Room1 | Room1 | Room1 | Room3 | ... |
| User 4 | Room2 | ... | ... | Room3 | Room3 | Room4 | Room4 |

FIG. 8

SYSTEM AND METHOD FOR DETERMINING METER PRESENCE UTILIZING AMBIENT FINGERPRINTS

RELATED APPLICATIONS

The present application is a continuation-in-part of nonprovisional U.S. patent application Ser. No. 13/341,453, filed Dec. 30, 2011 to Jain et al., titled "System and Method for Determining Contextual Characteristics of Media Exposure Data," assigned to the assignee of the present application and is incorporated by reference in its entirety herein.

TECHNICAL FIELD

Systems and methods are disclosed that are useful for monitoring use of research devices, including on-device and around-device characteristics, in accordance with predetermined criteria. More specifically, systems and methods are disclosed for collecting research data relating to media exposure, and further recording and processing ambient audio to identify users and their use of processing devices.

BACKGROUND INFORMATION

Research operations are conducted by establishing a panel of participants, often referred to as panelists. In some research operations, the panelists are provided with portable monitoring devices to gather research data. In other research operations the panelists' own portable devices are employed to gather research data. In either case, the panelists are instructed to carry the portable devices with them during the day for gathering research data, such as data indicating exposure to media and/or other market research data.

Those who pay to use such market research data want to be assured that the data is reliable. In particular, if the portable monitor was not actually carried about by a panelist during the day, whatever data has been collected by the portable monitor does not reflect the experience of a panelist. Accordingly, those who pay for use of such research data want reasonable assurances from the research organization that the portable monitors used to gather the data have actually been carried about by individuals or at least accompany individuals during the times that research data is collected by such monitors.

Arbitron Inc., which pioneered the use of portable monitors for gathering research data, has developed and implemented techniques to provide such assurances to those who license its research data. Such techniques are the subject of U.S. Pat. No. 5,483,276 issued Jan. 9, 1996 in the names of Brooks, et al., which is owned by the assignee of the present application and is hereby incorporated herein by reference in its entirety. In recent developments, cellular phones, laptops, tablet computers and similar computing devices have been configured to provide research data as well, where the research data is not only limited to received audio, but to computer-related areas as well, such as web usage, digital media usage and the like. As this research data grows in complexity, there is a need to determine contextual information regarding media exposure, such as device location and the like. Conventional methods for determining device location for contextual processing involve the determination of physical coordinates, such as latitude/longitude. However, the uses of physical coordinates are deficient in that they do not necessarily provide a logical location for the device. Additionally, issues of meter presence, e.g., if a panelist is in physical possession of more than one device, have become important as audience measurement details increase. As such, there is a need in the art to address these and related issues.

BRIEF SUMMARY

In one exemplary embodiment, a computer-implemented method is disclosed for determining portable device presence, the method comprising the steps of: receiving media exposure data from a plurality of portable devices at a first input; receiving environmental ambient fingerprints from the portable devices at a second input, wherein the environmental ambient fingerprints represent at least one characteristic of an environment around each of the plurality of portable devices; processing the environmental ambient fingerprints in a processor to determine if at least two of the environmental ambient fingerprints match; and identifying devices, via said processor, having matched environmental ambient fingerprints.

In another exemplary embodiment, a system is disclosed for determine portable device presence, comprising: an input for receiving media exposure data from a plurality of portable devices, wherein the input is further configured to receive environmental ambient fingerprints from the portable devices, and wherein the environmental ambient fingerprints represent at least one characteristic of an environment around each of the plurality of portable devices; and a processor, operatively coupled to the input, said processor being configured to process the received environmental ambient fingerprints to determine if at least two of the environmental ambient fingerprints match, said processor being further configured to identify devices having matched environmental ambient fingerprints.

BRIEF DESCRIPTION OF THE DRAWINGS

The present invention is illustrated by way of example and not limitation in the figures of the accompanying drawings, in which like references indicate similar elements and in which:

FIG. 1A illustrates various monitoring systems that include a portable user appliance ("PUA") used by a user and configured to operate as a research device;

FIG. 1B is a block diagram showing certain details of the monitoring systems of FIG. 1A;

FIG. 1C is a block diagram showing the monitoring systems of FIG. 1A including a PUA coupled with a docking station;

FIGS. 2A and 2B are flow diagrams illustrating actions by the monitoring systems of FIGS. 1A-1C which passively monitor use of the PUA;

FIG. 3 is a flow diagram illustrating actions by the monitoring systems of FIGS. 1A-1C which actively and passively monitor use of the PUA;

FIG. 4 is a block diagram of a cellular telephone configured to operate as a research device;

FIG. 4A is a functional block diagram for use in explaining certain embodiments involving the use of the cellular telephone of FIG. 4;

FIG. 6A illustrates an exemplary media exposure report for a user utilizing ambient fingerprints;

FIG. 8 illustrates an exemplary chart for determining and crediting a media event to a plurality of users based on ambient fingerprint location;

DETAILED DESCRIPTION

Figure 5:
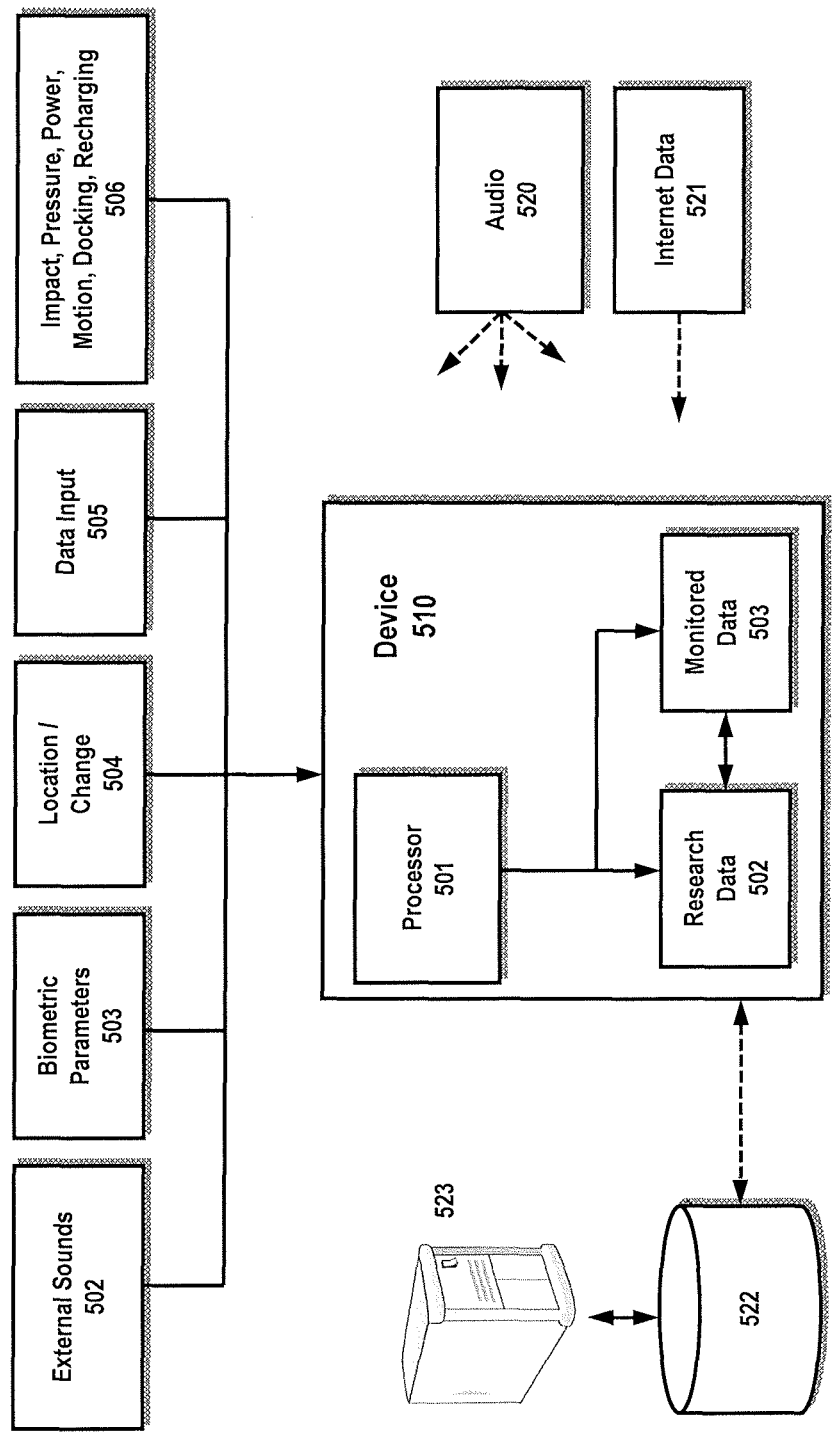
FIG. 5 illustrates an embodiment for providing contextual information relating to media data exposure.

Numerous types of research operations carried out with the use of research devices are possible, including, without limitation, television and radio program audience measurement; exposure to advertising in various media, such as television, radio, print and outdoor advertising, among others; consumer spending habits; consumer shopping habits including the particular retail stores and other locations visited during shopping and recreational activities; travel patterns, such as the particular routes taken between home and work, and other locations; consumer attitudes, beliefs, awareness and preferences; and so on. For the desired type of media and/or market research operation to be conducted, particular activity of individuals is monitored. In research operations research data relating to two or more of the foregoing are gathered, while in others only one kind of such data is gathered.

Various monitoring techniques are suitable. For example, television viewing or radio listening habits, including exposure to commercials therein, are monitored utilizing a variety of techniques. In certain techniques, acoustic energy to which an individual is exposed is monitored to produce data which identifies or characterizes a program, song, station, channel, commercial, etc. that is being watched or listened to by the individual. Where audio media includes ancillary codes that provide such information, suitable decoding techniques are employed to detect the encoded information, such as those disclosed in U.S. Pat. Nos. 5,450,490 and 5,764,763 to Jensen, et al., U.S. Pat. No. 5,579,124 to Aijala, et al., U.S. Pat. Nos. 5,574,962, 5,581,800 and 5,787,334 to Fardeau, et al., U.S. Pat. No. 6,871,180 to Neuhauser, et al., U.S. Pat. No. 6,862,355 to Kolessar, et al. issued Mar. 1, 2005 and U.S. Pat. No. 6,845,360 to Jensen, et al., issued Jan. 18, 2005, each of which is assigned to the assignee of the present application and all of which are incorporated herein by reference in their entireties.

Still other suitable decoding techniques are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al., U.S. Pat. No. 7,006,555 to Srinivasan, U.S. Pat. No. 6,968,564 to Srinivasan, PCT publication WO 05/99385 to Ramaswamy, et al., U.S. Pat. No. 6,879,652 to Srinivasan, U.S. Pat. No. 6,621,881 to Srinivasan and U.S. Pat. No. 6,807,230 to Srinivasan all of which are incorporated herein by reference in their entireties.

In some cases a signature is extracted from transduced media data for identification by matching with reference signatures of known media data. Suitable techniques for this purpose include those disclosed in U.S. Pat. No. 5,612,729 to Ellis, et al. and in U.S. Pat. No. 4,739,398 to Thomas, et al., each of which is assigned to the assignee of the present application and both of which are incorporated herein by reference in their entireties.

Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel and PCT publication No. WO 91/11062 to Young, et al., PCT Publication WO 05/006768 to Lee, et al., PCT Publication No. WO 06/023770 to Srinivasan, and PCT Publication No. WO 05/046201 to Lee, all of which are incorporated herein by reference in their entireties.

One advantageous technique carries out either or both of code detection and signature extraction remotely from the location where the research data is gathered, as disclosed in U.S. Published Patent Application 2003/0005430 published Jan. 2, 2003 to Ronald S. Kolessar, which is assigned to the assignee of the present application and is hereby incorporated herein by reference in its entirety. If location tracking or exposure to outdoor advertising is carried out, then various techniques for doing so are employed. Suitable techniques for location tracking or monitoring exposure to outdoor advertising are disclosed in U.S. Pat. No. 6,958,710 to Zhang et al., issued Oct. 25, 2005, and U.S. Published Patent Application 2005/0035857 published Feb. 17, 2005 to Zhang et al., filed Aug. 13, 2003, all of which are assigned to the assignee of the present application and hereby incorporated by reference herein in their entireties.

In addition to those types of research data mentioned above and the various techniques identified for gathering such types of data, other types of research data may be gathered and other types of techniques may be employed. For example, research data relating to consumer purchasing conduct, consumer product return conduct, exposure of consumers to products and presence and/or proximity to commercial establishments may be gathered, and various techniques for doing so may be employed. Suitable techniques for gathering data concerning presence and/or proximity to commercial establishments are disclosed in U.S. Published Patent Application 2005/0200476 published Sep. 15, 2005, to Forr et al., filed Mar. 15, 2004, and in U.S. Published Patent Application 2005/0243784 published Nov. 3, 2005, to Fitzgerald et al., filed Mar. 29, 2005. Suitable techniques for gathering data concerning exposure of consumers to products are disclosed in U.S. Published Patent Application 2005/0203798 published Sep. 15, 2005 to Jensen, et al., filed Mar. 15, 2004.

Moreover, techniques involving the active participation of the panel members may be used in research operations. For example, surveys may be employed where a panel member is asked questions utilizing the panel member's research device after recruitment. Thus, it is to be understood that both the exemplary types of research data to be gathered discussed herein and the exemplary manners of gathering research data as discussed herein are only illustrative and that other types of research data may be gathered and that other techniques for gathering research data may be employed. Certain research devices, including many disclosed in the patents and applications incorporated herein by reference, are intended solely for use in conducting research operations and do not implement functions of primary benefit to the user. Other research devices are implemented by, in or in combination with a PUA.

Various PUA's already have capabilities sufficient to enable the implementation of the desired monitoring technique or techniques to be employed during the research operation to enable their use as research devices. As an example, cellular telephones, laptops, and tablet computers have microphones which convert acoustic energy into audio data and GPS receivers for determining their locations. Various cellular telephones, laptops, and tablet computers further have processing and storage capabilities. In certain embodiments, various existing PUA's are modified merely by software and/or minor hardware changes to carry out a research operation. In certain other embodiments, PUA's are redesigned and substantially reconstructed for this purpose.

In certain embodiments, the research device itself is operative to gather research data. In certain embodiments, the research device emits data that causes another device to gather research data. Such embodiments include various embodiments disclosed in U.S. Pat. No. 6,958,710 and in U.S. patent application Ser. No. 11/084,481, referenced above, as well as U.S. provisional patent application No. 60/751,825 filed Dec. 20, 2005 assigned to the assignee of the present application and hereby incorporated herein by reference in its entirety. In certain embodiments, the research device is operative both to gather research data and to emit data that causes another device to gather research data.

Various embodiments of methods and systems for monitoring use of a research device by one or more users are described herein below. Referring to the drawings, FIGS. 1A and 1B are schematic illustrations of a monitoring system 1 that includes a processor-based Personal User Appliance (PUA) 2, which is used by a user 3, and a processor 5. In certain embodiments otherwise corresponding to the embodiment of FIGS. 1A and 1B, the PUA 2 is replaced by a research device that does not comprise a PUA. Processor 5 may include one or a plurality of processors which are located together or separate from one another disposed within or controlled by one or more organizations. As shown, the PUA 2 may be coupled to processor 5 via communications 7 which allows data to be exchanged between the PUA 2 and the processor 5. In certain embodiments, the PUA 2 is wirelessly coupled via communications 7 to the processor 5. In some embodiments, the monitoring system 1 also includes storage 6 for storing data including, but not limited to, data received and/or processed by the central processor 5. In certain embodiments storage 6 includes one or more storage units located together or separate from one another at the same or different locations. In certain embodiments storage 6 is included with processor 5.

FIG. 1B is a more detailed illustration of an embodiment of the monitoring system 1 in which the PUA 2 is adapted to communicate wirelessly with the processor 5 using wireless communications 8. PUA 2 includes a communication interface 9 for communicating and receiving data through communications 8. As shown, PUA 2 also includes message input 11 to allow the user of PUA 2 to input a message into PUA 2. Message input 11 is coupled with communication interface 9 of PUA 2, so that a message inputted using message input 11 can be communicated from PUA 2 via communications 8. It is understood that messages inputted using message input 11 may be communicated to processor 5, or to another PUA 2, or to another location or device coupled with communications 8. In the illustrative embodiment shown in FIG. 1B, message input 11 comprises a plurality of keys 11a in the form of a keypad. However, the configuration of message input 11 may vary, such that, for example, the message input 11 may comprise one or more of a key, a button, a switch, a keyboard, a microphone, a video camera, a touch pad, an accelerometer, a motion detector, a touch screen, a tablet, a scroll-and-click wheel or the like.

In the illustrative configuration shown in FIG. 1B, PUA 2 also comprises sensor or a detector 13 for detecting one or more parameters. The parameter or parameters detected by the sensor/detector 13 include, but are not limited to, the remaining power capacity of the PUA 2, one or more of a user's biometric functions or parameters, a location of the PUA 2, a change in location of the PUA 2, data input to the PUA by the user, sounds external to the PUA 2, motion of the PUA 2, pressure being applied to the PUA 2, or an impact of the PUA 2 with another object. In certain embodiments, sensor/detector 13 detects a presence indication signal or a personal identification signal emitted by a signal emitter 14 carried in or on the person of the user. In certain ones of these embodiments, signal emitter 14 comprises a device worn or carried by the user, such as an article of jewelry, a wristwatch, a key fob, and the like that are configured to emit a predetermined signal indicating a user's presence or the identity of the user wearing or carrying the device. The signal may be emitted as an acoustic signal, an RF or other electromagnetic signal, or a chemical signal that sensor/detector 13 is operative to receive, or an electrical signal (e.g., Bluetooth). In certain embodiments, the sensor/detector 13 includes a plurality of sensors or detectors each for detecting one or more of a plurality of parameters.

As shown in FIG. 1B, sensor/detector 13 is coupled with communications interface 9 of PUA 2 so that data produced as a result of the sensing or detecting performed by sensor/detector 13 can be communicated from PUA 2 to processor 5. Although PUA 2 shown in FIG. 1B includes both message input 11 and sensor/detector 13, it is understood that in other embodiments, one of these elements may be omitted depending on the design of the PUA 2 and the requirements of the monitoring system 1.

As in FIG. 1A, the illustrative configuration of the monitoring system 1 shown in FIG. 1B includes storage 6 coupled or included with the processor 5 to store data, including data received and/or processed by the processor 5. Data stored in storage 6 can also be retrieved by the processor 5 when needed. The PUA 2 shown in FIGS. 1A and 1B may be supplied with power from an A/C power source or other power supply, or using one or more batteries or other onboard power source (not shown for purposes of simplicity and clarity). It is understood that batteries used to supply power to the PUA 2 may include any type of batteries, whether rechargeable or not, that are suitable for use with the particular PUA 2. In certain embodiments, PUA 2 receives power from rechargeable batteries or another kind of rechargeable power supply, such as a capacitor, and/or from a radiant energy converter, such as a photoelectric power converter, or a mechanical energy converter, such as a microelectric generator. In certain embodiments, PUA 2 is connected with a docking station from time to time, which is used for charging PUA 2 and/or transmitting data stored in the PUA 2 to processor 5. FIG. 1C shows an embodiment of PUA 2 used with docking station 15. Docking station 15, which is typically not carried by the user and not coupled with PUA 2 while the PUA is being carried by the user, is adapted to couple with PUA 2 via a coupling 16. Coupling 16 can be a direct connection between PUA 2 and docking station 15 to allow recharging of PUA 2 and/or communication of data between PUA 2 and docking station 15. In certain embodiments, data is communicated from the PUA to the docking station by a wireless infra-red, RF, capacitive or inductive link. In certain embodiments, data is communicated from PUA 2 to processor 5 by cellular telephone link or other wired or wireless network or device coupling.

As shown in FIG. 1C, in certain embodiments the docking station is connected to power supply 17 to provide power for charging PUA 2 when PUA 2 is coupled with docking station 15. In addition, in certain embodiments the docking station 15 includes communication interface 19 adapted to communicate with processor 5 through communications 7. When PUA 2 is coupled with docking station 15 via coupling 16, data stored in PUA 2, such as data collected by the PUA 2 when it was carried by the user, is transferred to the docking station 15 using the coupling 16 and thereafter communicated using the communication interface 19 to the processor 5 through communications 7. In these embodiments, the use of the docking station 15, rather than the PUA 2, to communicate to processor 5 data collected by PUA 2 enables conservation of power by PUA 2 or the use of an internal power supply having a relatively low power capacity. In certain embodiments, docking station 15 is also used to receive data from processor 5 via communications 7, and to transfer the received data from docking station 15 to PUA 2 via coupling 16 when PUA 2 is coupled with docking station 15. As can be appreciated, the configuration of the docking station 15 is not limited to the configuration shown in FIG. 1C and may vary from one embodiment to another.

In certain embodiments, the PUA 2 shown in FIGS. 1A-1C optionally includes an output (not shown for purposes of simplicity and clarity) for outputting a message to the user. The output can be in the form of a display for displaying text, or one or more symbols and/or images, a speaker or earphone for outputting a voicemail or a voice message, or one or more LED's or lamps for indicating a message to the user. It is understood that the output or outputs are not limited to the examples provided herein and can comprise any suitable output or outputs adapted to provide a message to the user.

Monitoring system 1 shown in FIGS. 1A and 1B is used in certain embodiments for monitoring use by a user of the PUA 2 in accordance with at least one predetermined use criterion, namely, that the PUA 2 is being carried and/or used by a specific user. In certain embodiments, the monitoring system 1 is used to determine the identity of the user, whether or not a specific user, so that the data gathered by or with the use of the PUA 2 can be associated with the identity of the actual user. In certain embodiments, the monitoring system 1 monitors use of the PUA 2 in accordance with one or more of the following criteria: that the PUA 2 is being carried and/or used, that the PUA 2 is turned "on," that the PUA 2 is charged, that the PUA 2 maintains a minimum power capacity, that the PUA 2 is, or has been, docked at, or connected with, the docking station 15 for a predetermined length of time, at certain times or during a predetermined time period, that the PUA is functioning properly to provide a benefit to the user, and that the PUA 2 is capable of collecting, storing and/or communicating research data, or of cooperating with one or more other devices to do so. Other predetermined use criteria not mentioned above may also be employed in monitoring the PUA's use.

In certain embodiments, the method of monitoring use by a user of a research device such as PUA 2 in accordance with at least one predetermined use criterion comprises "active" monitoring that requires a specific action or input from a user on a device. Typically, the action is prompted by a request message requesting data of a predetermined type, or a response within a given time. Descriptions of various embodiments directed to active monitoring are described in U.S. patent application Ser. No. 11/776,940 and are incorporated by reference herein.

In certain embodiments of monitoring methods and systems, the monitoring system monitors one or more parameters, such as biometric parameters, sounds external to a research device, an impact of the research device with another object, motion of the research device, proximity of the research device to the person of a user, pressure applied to the research device, recharging of the research device, its power capacity, docking of the research device, data input (e.g., messages) to the research device, location of the research device and/or changes in the research device's location, to determine whether the use of the research device is in compliance with at least one predetermined criterion. In one illustrative embodiment, the monitoring system produces monitored data by monitoring at least one of a user's heart activity, a user's brain activity, a user's breathing activity, a user's pulse, a user's blood oxygenation, a user's borborygmus (gastrointestinal noise), a user's gait, a user's voice, a user's key, keypad or keyboard usage characteristics (e.g., keystroke recognition), a user's vascular pattern, a user's facial or ear patterns, a user's signature, a user's fingerprint, a user's handprint or hand geometry, a user's retinal or iris patterns, a user's airborne biochemical indicators (sometimes referred to as a user's "smellprint"), a user's muscular activity, a user's body temperature, sounds external to the research device, motion of the research device, pressure applied to the research device, recharging of the research device, docking of the research device, its power capacity, an impact of the research device with another object, data input to the research device by a user, location of the research device and a change in a location of the research device, and determines whether use of the research device by the user is in accordance with at least one predetermined criterion based on the monitored data. The operations of the monitoring system in these illustrative embodiments to monitor use of a PUA are shown in FIG. 2A. It will be appreciated that the embodiment of FIG. 2A is also applicable to a research device that is not a PUA.

As shown in FIG. 2A, at least one of a biometric parameter 222, proximity of the PUA to the person of a user, external sounds 224, PUA location, PUA location change 226, data input 228 and impact of the PUA with another object, pressure applied to the PUA, power capacity, motion, recharging, docking 230 are monitored to produce monitored data. When one or more biometric parameters is monitored 222, these parameters include, but are not limited to, one or more of the user's heart activity, the user's brain activity, the user's breathing activity, the user's pulse, the user's blood oxygenation, the user's borborygmus, the user's gait, the user's key, keypad or keyboard usage characteristics, the user's voice, the user's fingerprint, the user's handprint or hand geometry, the user's retinal or iris patterns, the user's smellprint, a vascular pattern of the user, the user's facial or ear patterns, a pattern of muscle activity of the user, the user's signature, and the user's body temperature.

Referring again to FIG. 2B, the monitoring of the biometric parameters 222, external sounds, PUA location, PUA location changes 226, data input 228 and/or impact of the PUA with another object, pressure applied to the PUA, motion of the PUA, recharging, power capacity, docking 230 is performed in the PUA 2 by the sensor/detector 13 in cooperation with a processor of the PUA (not shown for purposes of simplicity and clarity). As mentioned above, the sensor/detector 13 in certain embodiments includes a plurality of sensors and/or detectors which monitor a plurality of parameters. In the embodiments in which the sensor/detector 13 monitors one or more biometric parameters of the PUA user 222, the sensor/detector 13 comprises one or more of a heart monitor for monitoring heart activity of the user, an EEG monitor for monitoring the user's brain activity, a breathing monitor for monitoring the user's breathing activity including, but not limited to, the user's breathing rate, a pulse rate monitor, a pulse oximeter, a sound detector for monitoring the user's borborygmus and/or the user's voice, a gait sensor and/or a gait analyzer for detecting data representing the user's gait, such as a motion sensor or accelerometer (which may also be used to monitor muscle activity), a video camera for use in detecting motion based on changes to its output image signal over time, a temperature sensor for monitoring the user's temperature, an electrode or electrodes for picking up EKG and/or EEG signals, and a fingerprint or handprint scanner for detecting the user's fingerprint or handprint. Where the user's retinal or iris patterns are monitored, sensor/detector 13 comprises a low-intensity light source, for scanning, detecting or otherwise sensing the retinal or iris patterns of the user. Where the user's hand geometry is detected, sensor/detector 13 comprises a device configured with an optical sensor or other imaging device to capture predetermined parameters of the user's hand, such as hand shape, finger length, finger thickness, finger curvature and/or any portion thereof. Where the user's smellprint is detected, sensor/detector 13 comprises an electronic sensor, a chemical sensor, and/or an electronic or chemical sensor configured as an array of chemical sensors, wherein each chemical sensor may detect a specific odorant or other biochemical indicator. Where a vascular pattern of the user is detected, sensor/detector 13 comprises an optical or other radiant energy scanning or imaging device for detecting a vascular pattern or other tissue structure, or blood flow or pressure characteristic of the user's hand or other body part. Where the user's facial or ear patterns are detected, the sensor/detector 13 comprises a video camera, optical scanner or other device sufficient to recognize one or more facial features or one or more features of the user's ear or other body part. In certain ones of these embodiments, the sensor/detector 13 is mounted in or on the PUA 2, while in others the sensor/detector 13 is arranged separately from the PUA 2 and communicates therewith via a cable or via an RF, inductive, acoustic, infrared or other wireless link.

In the embodiments in which the sensor/detector 13 of the PUA 2 monitors sounds external to the PUA 224, the sensor/detector 13 comprises an acoustic sensor such as a microphone or any other suitable sound detector for detecting external sounds. In certain embodiments, the sensor/detector 13, which monitors external sounds, cooperates with the processor for analyzing the detected external sounds. The external sounds detected by the sensor/detector 13 include, but are not limited to, environmental noise, rubbing of the PUA 2 against the user's clothing or other external objects, vehicle sounds (such as engine noise and sounds characteristic of opening and closing car doors), the user's voice print, dropping of the PUA, average ambient noise level, and the like.

In certain ones of the embodiments in which the sensor/detector 13 monitors the user's data input 228 (e.g., messages or inputs to control a diverse operation of the PUA, such as to make use of an application running thereon, like a game), the sensor/detector 13 comprises a pressure sensor for sensing pressure applied to the message input by the user. Alternatively or in addition, the sensor/detector 13 comprises a utility, such as a key logger, running on the processor of the PUA to determine and record its usage.

In the embodiments in which location change is being monitored 226, the sensor/detector 13 directly or indirectly detects the change in the PUA's location. Direct detection of the PUA's location is accomplished by detecting the location of the PUA and the change in PUA's location over time. In this case, the sensor/detector 13 comprises a satellite location system, such as a GPS receiver, an ultra wideband location detector, a cellular telephone location detector, an angle of arrival location detector, a time difference of arrival location detector, an enhanced signal strength location detector, a location fingerprinting location detector, an inertial location monitor, a short range location signal receiver or any other suitable location detector. The same means can also be employed to determine the PUA's location. Indirect detection of the PUA's location change is accomplished by detecting a predetermined parameter which is directly or indirectly related to the location of the PUA and determining from variations in the predetermined parameter whether a change in the location of the PUA has occurred. One of such predetermined parameters detected by the sensor/detector 13 can be variations in the strength of a RF signal received by the PUA, and in such case, the sensor/detector 13 comprises a RF signal receiver. Where location change data is available such data is used in certain embodiments to determine whether and when the PUA was or is being carried.

In embodiments in which the sensor/detector 13 monitors the impact of the PUA 2 with another object 230, the sensor/detector 13 comprises an impact detector for measuring predetermined levels of impact of the PUA 2 with other objects. In certain embodiments, the sensor/detector 13 comprises an accelerometer for detecting a relatively large acceleration upon impact of the PUA 2 with another object. In embodiments where pressure applied to the PUA is monitored, a pressure sensor is placed on an enclosure of the PUA or mechanically coupled therewith to receive force applied to such enclosure. In certain ones of such embodiments, the magnitude of the pressure as it varies over time and/or with location on the enclosure are analyzed to determine if the PUA is being or was carried and/or the manner in which it was used and/or the event of non-use.

In certain embodiments where motion of the PUA is monitored, a video camera of the PUA is used as a motion sensor. In certain ones of such embodiments, changes in the image data provided at the output of the video camera (either the entire image or one or more portions thereof) are processed to determine movement or an extent of movement of the image over time to detect that the PUA is being moved about, either by translation or rotation. Techniques for producing motion vectors indicating motion of an image or an extent of such motion are well known in the art, and are used in certain embodiments herein to evaluate whether the PUA is moving and/or the extent of such movement. In certain ones of such embodiments, changes in the light intensity or color composition of the image data output by the video camera (either the entire image or one or more portions thereof) over time are used to detect motion of the PUA. In certain embodiments where motion of the PUA is monitored, a light sensitive device, such as a light sensitive diode of the PUA, is used as a motion sensor. Changes in the output of the light sensitive device over time that characterize movement serve to indicate that the PUA is being carried.

In certain embodiments, the one or more parameters also include power remaining in the PUA, recharging of the PUA and/or the event of docking of the PUA by coupling the PUA with the docking station, for example, as illustrated in FIG. 1C. In such embodiments, the monitoring system produces monitored data by monitoring the power remaining in the PUA and/or by monitoring the docking of the PUA at the docking station. In the embodiments in which the docking of the PUA is monitored, the monitoring system monitors the length of time the PUA was coupled with the docking station, the time period during which the PUA was coupled with the docking station, a time at which the PUA is docked, a time at which the PUA was undocked, whether or not the PUA is coupled with the docking station and/or the length of time passed since the PUA was last docked at the docking station.

In certain embodiments, monitored data comprises data which can be used to confirm the identity of the PUA user. For example, if one or more biometric parameters of the user are monitored by the sensor/detector, the monitored data includes data indicating or relating to one or more of the user's heart rate or other heart activity or parameter, EEG, blood oxygenation, breathing rate or other breathing activity or parameter, borborygmus, gait, voice, voice analysis, key, keypad or keyboard usage characteristics, fingerprints, handprints, hand geometry, pulse, retinal or iris patterns, olfactory characteristics or other biochemical indicators, patterns of muscular activity, vascular patterns, facial or ear patterns, signature, and/or body temperature detected once or a plurality of times over a predetermined period of time. In certain embodiments, the user is identified by a signal from signal emitter 14. In another example, if the PUA location change is being monitored, then monitored data can include data relating to the specific locations or changes in location of the PUA and/or relating to the specific RF signal strengths of the PUA detected one or a plurality of times over a predetermined period of time.

Referring now back to FIG. 2A, the monitored data produced by monitoring at least one of a user's biometric parameters, external sounds, PUA location or location change, data input, pressure applied to the PUA, impact of a PUA with another object, a signal from signal emitter 14, PUA motion, PUA power level, recharging and docking of the PUA at the docking station is used to determine whether the user's use of the PUA is in compliance with the predetermined criteria and/or the user's level of compliance 242. In certain embodiments, the determination of compliance and/or level of compliance is performed in the PUA by its processor, while in other embodiments, the monitored data produced in the PUA is communicated to the processor 5 via its communications and the processor 5 then determines the user's compliance and/or level of compliance.

In certain embodiments, the determination of compliance and/or level of compliance is performed based on the detection or non-detection of one or more monitored parameters, as indicated by monitored data, to determine whether the PUA was carried and/or was charged at the monitoring times and/or whether the PUA was docked and/or undocked at predetermined times or time periods. In certain embodiments in which, as mentioned above, monitored data includes more specific or extensive data, the determination of compliance and/or level of compliance includes not only a determination whether the PUA was carried but also a confirmation that the PUA was carried by a specific user. In such embodiments, the compliance determination is performed by comparing the monitored data with pre-stored data relating to the specific user to determine whether the PUA was carried and whether the user carrying the PUA was the specific user. In particular, if the monitored data corresponds to the stored data for the specific user, then it is determined that the user carrying the PUA was the specific user. However, if the monitored data does not correspond to the stored data for the specific user, then it is determined that the user carrying the PUA was not the specific user. The determination whether the PUA use is in compliance with the predetermined criteria and/or the determination of the level of the user's compliance is then based on the determinations whether the PUA was carried and whether the user carrying the PUA was the specific user.

In certain embodiments, the PUA use is determined to be in compliance with the predetermined criteria if it is determined that the PUA was carried by the specific user and not in compliance if it is determined that the PUA was not carried. Depending on requirements of the monitoring systems and the predetermined criteria, in some embodiments the PUA use is determined to be in compliance, or in partial compliance, if it is determined that the PUA was carried by someone other than the specific user. However, in other embodiments, the monitoring system determines that the PUA use does not comply with the predetermined criteria if it is determined that the PUA was carried by someone other than the specific user.

With respect to the determination of the level of compliance, in certain embodiments, the highest level of compliance is determined if it is determined that the PUA was being carried by the specific user and the lowest level of compliance is determined if it is determined that the PUA was not carried. In certain embodiments, if the PUA was carried by someone other than the specific user at all or some of the monitoring times, then an intermediate level of compliance that is lower than the highest level and higher than the lowest level is determined. The value of the intermediate compliance level may depend on whether the PUA was carried by someone other than the specific user at all or some of the times and the number of times that it is determined that the PUA was carried by someone other than the specific user, if a plurality of determinations are made.

As shown in FIG. 2A, the user of the PUA may optionally be rewarded for the user's compliance with the predetermined use criteria. As discussed above, providing a reward to the user in return for the compliant use of the PUA provides an incentive for the user to comply with the PUA use requirements in the future. In the embodiments where the monitoring system provides a reward to the user, the reward to the user is determined 244 after the determination of compliance and/or level of compliance 242 is made. The determination of the reward is based on whether the user has complied with the predetermined use criteria and/or based on the level of user's compliance, and can be performed in the PUA or in the processor. As mentioned above with respect to FIGS. 2A and 2B, the reward to the user can include cash, credit, points usable to make purchases, services or other benefit to the user.

As also shown in FIG. 2A, in certain embodiments, the monitoring system optionally communicates a message to the PUA user indicating compliance and/or level of compliance and/or a reward earned by the user 246. In these embodiments, the message can be in the form of a telephone call, a text message, a voice mail, a voice message, an image, an email, a web page, a paper notification or any other suitable indication to the user. In certain ones of such embodiments, a light is illuminated or blinks, or a sound is emitted (similar to a voice mail notification) at intervals (such as an interval from one to five minutes) to indicate compliance or non-compliance. Where the light or sound notification indicates non-compliance, its intensity and/or frequency increases over time to gain the user's attention. Referring now to FIG. 1B, if the determination of compliance, level of compliance and/or reward is performed by the processor of the PUA, the message indicating compliance, level of compliance and/or reward can be communicated to the user by the PUA. If, on the other hand, the determination of compliance, level of compliance and/or reward is performed by the processor 5, the message can be communicated to the PUA to provide the message to the user, or the message can be communicated to the user by another means.

As discussed above, the determination of a reward to the user 244 and the communication of a message to the user 246 are optional. Thus, it is understood that the monitoring system may perform both, none or only one of these actions, depending on the arrangement of the PUA and the requirements of the monitoring system.

In certain other embodiments, methods and systems for monitoring use by a user of a research device comprise producing monitored data by monitoring one or more parameters, producing identification data identifying the user based on the monitored data and determining, based on the identification data, whether the research device is being used by the user in accordance with at least one predetermined use criterion. FIG. 2B illustrates the actions performed by the monitoring system of this embodiment wherein the research device comprises a PUA, but it will be appreciated the monitoring system is also applicable to embodiments in which the research device does not comprise a PUA. In FIG. 2B, actions performed by the monitoring system similar to those illustrated in FIG. 2A are indicated by the same reference numbers as in FIG. 2A.

As shown in FIG. 2B, the monitoring system monitors at least one of a user's biometric parameter 222, external sounds, a presence indication signal, a personal identification signal 224, PUA location, PUA location change 226, data input to the PUA 228 and impact of the PUA with another object, motion of the PUA, pressure applied to the PUA 230. As discussed herein above with respect to FIG. 2A and referring to FIG. 1B, the monitoring is performed by the sensor/detector 13 in the PUA 2, and as a result of this monitoring, monitored data relating to the parameters monitored is provided. In certain ones of these embodiments, the monitor stores one or more signatures, feature sets or other characteristic data of the panelist assigned to the PUA (and thus the person who should be its sole user) to which the monitored data is compared to determine if the data match. This comparison provides an indication whether the PUA in fact is being carried and/or used by the correct user. If, for example, the monitoring system monitors the sounds external to the PUA, the monitored data will include not only an indication that an external sound was detected, but also data relating to the sound that was detected, such as analysis of the detected sound, the frequency of the detected sound, voice identification data and/or other data relating to the detected sound, from which a sound signature or feature set can be produced for comparison against a stored signature or feature set to assess whether the PUA is in the possession of the correct user. In certain embodiments, the monitored data is used to determine whether the PUA is being carried. Thus, for example, if the monitoring system monitors the location change of the PUA, the monitored data will include data not only indicating a change in the PUA's location, it may be inferred that the monitor is in the possession of a user who is carrying it about.

Referring to FIG. 2B, the monitored data produced by monitoring one or more of the above-mentioned parameters is used to provide identification data which is, in turn, used to identify the user of the PUA 251. In certain embodiments, the identification data is provided by the PUA and/or the docking station, while in other embodiments, the monitored data is communicated from the PUA to the processor 5 via the communications and the processor 5 provides the identification data based on the monitored data. In certain embodiments, the identification data is provided by comparing the monitored data with pre-stored data relating to at least one PUA user so as to determine the identity of the PUA user and/or to confirm that the PUA user is the specific user corresponding to the pre-stored data. The pre-stored data may be based on data relating to the PUA user obtained from the specific user in advance, or may be based on previously collected monitored data. By providing the identification data relating to the identity of the user, the monitoring system is adapted to confirm that a specific person, and not someone else, is carrying and/or using the PUA.

When the identification data is produced in 251, the monitoring system determines whether the use of the PUA is in compliance with at least one predetermined use criterion and/or the level of the user's compliance 242. This determination 242 is made based on the identification data identifying the user. In some embodiments, in which the identification data indicates that the person carrying and/or using the PUA is the corresponding, or correct, PUA user, the monitoring system determines in 242 that the PUA user has complied with at least one predetermined use criterion. The level of the user's compliance can be determined based on whether or not the PUA was carried and/or used in accordance with the predetermined criteria and based on whether or not identification data indicates that the person carrying and/or using the PUA matches the corresponding user for the PUA, as well as based on the frequency of compliant use indications. Thus, for example, a first level of compliance is determined if the identification data indicates that the PUA was carried by the user corresponding to the specific user for the PUA, a second level of compliance which is lower than the first level of compliance is determined if the identification data indicates that the PUA was carried by a user who does not correspond to the specific user of the PUA and a third level of compliance, which is lower than both the first and the second levels, is determined if the identification data indicates that the PUA was not carried by any user. It is understood that these compliance levels are illustrative and that the number of levels and how these levels are determined may vary.

In certain embodiments described herein, the methods and systems for monitoring use of a research device in accordance with at least one predetermined use criterion comprise actively monitoring use of the research device by the user by communicating a message to the user requesting a response and passively monitoring use of the research device by the user by sensing at least one parameter indicating whether the research device is being used in accordance with the at least one predetermined criterion. FIG. 3 illustrates the actions performed by the monitoring system in these embodiments where the research device comprises a PUA. In other embodiments, the monitoring system monitors the use of a research device that does not comprise a PUA.

As shown in FIG. 3, the monitoring system actively and passively monitors the use of the PUA. Active monitoring 260 of the PUA use includes requesting an action by the user to show compliance with at least one predetermined use criterion and may comprise communicating a request message to the user requesting a response to the request message. Unlike active monitoring 260, passive monitoring 262 does not request any specific action to be performed by the user so as to indicate compliance with the PUA use criteria, and comprises sensing or detecting one or more parameters that indicate whether the PUA is being used in compliance with at least one predetermined criterion. Referring to FIG. 1B, the sensing or detecting is performed in the PUA 2 by the sensor/detector 13, and includes, but is not limited to, one or more of sensing a biometric parameter of the user, detecting a presence indication signal or a personal identification signal, sensing external sounds, detecting location of the PUA, detecting location change of the PUA, detecting motion of the PUA, detecting data input, sensing pressure applied to the PUA, detecting recharging, power capacity and/or docking of the PUA and detecting impact of the PUA with another object. These passive monitoring activities are similar to those described herein above with respect to FIGS. 3A and 3B, and therefore detailed description thereof is unnecessary.

In certain embodiments, the PUA carries out passive monitoring to produce passively monitored data, the monitoring system communicates a request message to the PUA, the PUA automatically produces a response including and/or based on the passively monitored data and communicates the response to the monitoring system and the monitoring system determines whether the use of the PUA complies with at least one predetermined use criterion based on the passively monitored data. In certain ones of such embodiments, the PUA communicates its response at a time when the PUA is to be carried in accordance with a predetermined schedule. In certain ones of such embodiments, the monitoring system communicates the request at a time when the PUA is to be carried in accordance with a predetermined schedule.

FIG. 4 is a block diagram of an exemplary cellular telephone 20 modified to carry out a research operation. The cellular telephone 20 comprises a processor 30 that is operative to exercise overall control and to process audio and other data for transmission or reception and communications 40 coupled to the processor 30 and operative under the control of processor 30 to perform those functions required for establishing and maintaining a two-way wireless communication link with a respective cell of a cellular telephone network. In certain embodiments, processor 30 also is operative to execute applications ancillary or unrelated to the conduct of cellular telephone communications, such as applications serving to download audio and/or video data to be reproduced by cellular telephone 20, e-mail clients and applications enabling the user to play games using the cellular telephone 20, and receive and/or execute other network data. In certain embodiments, processor 30 comprises two or more processing devices, such as a first processing device (such as a digital signal processor) that processes audio, and a second processing device that exercises overall control over operation of the cellular telephone 20. In certain embodiments, processor 30 employs a single processing device. In certain embodiments, some or all of the functions of processor 30 are implemented by hardwired circuitry.

Cellular telephone 20 further comprises storage 50 coupled with processor 30 and operative to store data as needed. In certain embodiments, storage 50 comprises a single storage device, while in others it comprises multiple storage devices. In certain embodiments, a single device implements certain functions of both processor 30 and storage 50. In addition, cellular telephone 20 comprises a microphone 60 coupled with processor 30 to transduce the audio to an electrical signal which it supplies to processor 30 for encoding or other purposes, and a speaker and/or earphone 70 coupled with processor 30 to convert received audio from processor 30 to an acoustic output to be heard by the user. Cellular telephone 20 also includes a user input 80 coupled with processor 30, such as a keypad, to enter telephone numbers and other control data, as well as a display 90 coupled with processor 30 to provide data visually to the user under the control of processor 30.

In certain embodiments, the cellular telephone 20 provides additional functions and/or comprises additional elements. In certain ones of such embodiments, the cellular telephone 20 provides e-mail, text messaging and/or web access through its wireless communications capabilities, providing access to media and other content. For example, Internet access by the cellular telephone 20 enables access to network data such as video and/or audio content that can be reproduced by the cellular telephone for the user, such as songs, video on demand, video clips and streaming media. In certain embodiments, storage 50 stores software providing audio and/or video downloading and reproducing functionality, such as iPod™ software, enabling the user to reproduce audio and/or video content downloaded from a source, such as a personal computer via communications 40 or through Internet access via communications 40.

To enable cellular telephone 20 to gather research data, namely, data indicating exposure to network data and/or audio such as programs, music and advertisements, research software is installed in storage 50 to control processor 30 to gather such data and communicate it via communications 40 to a research organization. The research software in certain embodiments also controls processor 30 to store the data for subsequent communication In certain embodiments, the research software controls the processor 30 to decode ancillary codes in the transduced audio from microphone 60 using one or more of the known techniques described hereinabove, and then to store and/or communicate the decoded data for use as research data indicating encoded audio to which the user was exposed. In certain embodiments, the research software controls the processor 30 to extract a signature from the transduced audio from microphone 60 using one or more of the known techniques identified hereinabove, and then to store and/or communicate the extracted signature data for use as research data to be matched with reference signatures representing known audio to detect the audio to which the user was exposed. In certain embodiments, the research software both decodes ancillary codes in the transduced audio and extracts signatures therefrom for identifying the audio to which the user was exposed. In certain embodiments, the research software controls the processor 30 to store samples of the transduced audio, either in compressed or uncompressed form for subsequent processing either to decode ancillary codes therein or to extract signatures therefrom. In certain ones of these embodiments, the compressed or uncompressed audio is communicated to a remote processor for decoding and/or signature extraction.

Where the cellular telephone 20 possesses functionality to download and/or reproduce presentation data, in certain embodiments, research data concerning the usage and/or exposure to such presentation data as well as audio data received acoustically by microphone 60, is gathered by cellular telephone 20 in accordance with the technique illustrated by the functional block diagram of FIG. 5A. Storage 50 of FIG. 5 implements an audio buffer 54 for audio data gathered with the use of microphone 60. In certain ones of these embodiments storage 50 implements a buffer 56 for presentation data downloaded and/or reproduced by cellular telephone 20 to which the user is exposed via speaker and/or earphone 70 or display 90, or by means of a device coupled with cellular telephone 20 to receive the data therefrom to present it to a user. In some of such embodiments, the reproduced data is obtained from downloaded data, such as songs, web pages or audio/video data (e.g., movies, television programs, video clips). In some of such embodiments, the reproduced data is provided from a device such as a broadcast or satellite radio receiver of the cellular telephone 20 (not shown for purposes of simplicity and clarity). In certain ones of these embodiments storage 50 implements a buffer 56 for metadata of presentation data reproduced by cellular telephone 20 to which the user is exposed via speaker and/or earphone 70 or display 90, or by means of a device coupled with cellular telephone 20 to receive the data therefrom to present it to a user. Such metadata can be, for example, a URL from which the presentation data was obtained, channel tuning data, program identification data, an identification of a prerecorded file from which the data was reproduced, or any data that identifies and/or characterizes the presentation data, or a source thereof. Where buffer 56 stores audio data, buffers 54 and 56 store their audio data (either in the time domain or the frequency domain) independently of one another. Where buffer 56 stores metadata of audio data, buffer 54 stores its audio data (either in the time domain or the frequency domain) and buffer 56 stores its metadata, each independently of the other.

Processor 30 separately produces research data 58 from the contents of each of buffers 54 and 56 which it stores in storage 50. In certain ones of these embodiments, one or both of buffers 54 and 56 is/are implemented as circular buffers storing a predetermined amount of audio data representing a most recent time interval thereof as received by microphone 60 and/or reproduced by speaker and/or earphone 70, or downloaded by cellular telephone 20 for reproduction by a different device coupled with cellular telephone 20. Processor 30 extracts signatures and/or decodes ancillary codes in the buffered audio data to produce research data. Where metadata is received in buffer 56, in certain embodiments the metadata is used, in whole or in part, as research data 58, or processed to produce research data 58. The research data is thus gathered representing exposure and/or usage of audio data by the user where audio data is received in acoustic form by the cellular telephone 20 and where presentation data is received in non-acoustic form (for example, as a cellular telephone communication, as an electrical signal via a cable from a personal computer or other device, as a broadcast or satellite signal or otherwise).

In certain embodiments, the cellular telephone 20 is provided with a research data source 96 coupled by a wired or wireless coupling with processor 30 for use in gathering further or alternative research data to be communicated to a research organization. In certain ones of these embodiments, the research data source 96 comprises a location data producing device or function providing data indicating a location of the cellular telephone 20. In certain embodiments, research data source 96 comprises one or more devices for receiving, sensing or detecting data useful in implementing one or more of the foregoing functions, other research data gathering functions and/or for producing data ancillary to functions of gathering, storing and/or communicating research data. Such devices include, but are not limited to, motion detectors, accelerometers, temperature detectors, proximity detectors, satellite positioning signal receivers, video cameras, image scanners using visible or infra-red light or other radiant energy, chemical sensors, digital writing tablets, blood flow sensors, pulse oximeters, pulse monitors, RFID readers, RF receivers, wireless networking transceivers, wireless device coupling transceivers, pressure detectors, deformation detectors, electric field sensors, magnetic field sensors, optical sensors, electrodes (such as EEG and/or EKG electrodes), audio sensors, and the like. In certain embodiments, such devices are supplied in cellular telephones to provide a user-beneficial function, so that their capabilities can also be employed to gather research data and/or to gather data indicating whether the panelist has complied with predetermined use criteria. Such devices include but are not limited to, microphones, video cameras and satellite positioning signal receivers. Other embodiments describing functions relating to signature recognition, voice recognition, image recognition, keyboard usage sensing, motion sensing and the like are disclosed in U.S. patent application Ser. No. 11/776,940 and are incorporated by reference herein.

It is understood that the process of compliance detection implicitly involves monitoring the characteristics and use of a device, as well as monitoring the environment surrounding the device. This is sometimes referred to in the art as "contextualization" and refers to determining the environment or "context" in which certain events in a device take place. For example, if it is determined that a user often listens to music at the same time an accelerometer registers a high degree of activity, it can be inferred that the user listens to music while exercising. Similarly, if a device downloads a first type of data when a first temperature is detected, and downloads a second type of data when a second temperature is detected, it can be inferred that the first data was downloaded from a first location, while the second data was downloaded from a second location. Continuing with the example, if GPS coordinates are registered as well, the different temperature readings could be used to determine or confirm that the first location was a user's home, while the second location was the user's office.

Part of the contextual process involves the concept of localization, which is not simply concerned with physical coordinates (latitude/longitude) but also includes the identification of logical locations and/or labels (e.g., Starbucks, Target). For applications utilizing localization, they have the advantage of being focused on identifying the place of the user, instead of the user's physical location. Localization is performed using ambient sensing, which focuses on elements such as light, sound, color, movement etc. One exemplary system utilizing such measurement and sensing is described in Azizyan et al., "SurroundSense: Mobile Phone Localization via Ambience Fingerprinting" Proc. 15th ACM MobiCom, 2009, pp. 261-72. However, systems like SurroundSense require burdensome "fingerprint factories" across multiple ambient platforms (e.g., light, sound, color, WiFi) that are often difficult to implement and cumbersome to use.

Turning to FIG. 5, an exemplary embodiment is disclosed, where a device 510 (e.g., PC, tablet, cell phone, etc.) passively collects data on external sounds 502, biometric parameters 504, location (and/or change of location) 504, data input from the user 505 as well as impact, pressure, power, motion, docking and/or recharging 506 as it relates to device 510. These features were previously discussed above in connection with FIGS. 2A-B and will not be repeated for the purposes of brevity. In the embodiment of FIG. 5, external sounds, such as ambient room noise/sounds, are subjected to acoustic processing via processor 501 of device 510 to produce ambient fingerprints that are stored as part of monitored data 503. Under one embodiment, ambient fingerprints are formed using a "training" procedure, where a user records environmental ambient audio and labels the resulting fingerprint(s) (e.g., backyard, bedroom, etc.) using device 510. In another embodiment, environmental ambient fingerprints (hereafter "ambient fingerprints") are independently collected by $3^{rd}$ parties and stored in a memory device 522. These fingerprints may subsequently be used for matching ambient fingerprints from device 510 at a remote server, or alternately transmitted to device 510 for possible matching. For the purposes of this disclosure, the terms "fingerprint" and "signature" may be considered synonymous terms and are generally directed to transforming an audio portion from the frequency domain and/or time domain into a format that represents one or more characteristics of the audio that is smaller in size compared to the original audio portion.

Ambient fingerprints are formed using the persistent acoustic noises/sounds of a room, where the room's impulse responses combine to form a distinct characteristic for a room. In one embodiment, the ambient fingerprint is formed using a compact histogram of a sound recording from the time domain. The histogram is preferably formed from signal amplitudes from divided portions (e.g., 100 equal intervals) of an audio sample. In another embodiment, the ambient fingerprint is formed using a compact spectral representation. When forming the spectral representation, an audio sample is taken of a room for a period of time (e.g., 10-30 sec.), where the sample is divided into frames of a predetermined length. Each frame is then multiplied by a window function vector to reduce frame boundary signal magnitudes, and the power spectrum for each frame is computed. Since ambient signatures will have less distinct characteristics as compared to music or speech, the power spectrum may be calculated using a higher-resolution FFT (e.g., greater than 1×), where the result elements are multiplied by their complex conjugates to determine power. To make the power spectrum calculation more efficient, redundant elements may be discarded after the higher-resolution FFT is performed.

After a spectrogram is formed, filtering may be performed on the frequency bins to isolate specific bins of interest, resulting in a representation demonstrating variations of the frequency content over time. Since the ambient fingerprint is susceptible to transient noise, it may be advantageous to utilize smaller values observed for each frequency in a sampling window to extract out background sound levels while rejecting perceived transient noise (e.g., room chatter). For example, by using values from each bin having a lower-percentage value (e.g., 5-10%), transient noises lasting for periods that are less than the remaining value (e.g., 90-95%) of the sampling window will be rejected. Rows of bins may be individually sorted according to increasing frequency and magnitude when the values are being selected for the purposes of efficiency. It is understood that other value calculations, such as using mean or average values, may be utilized as well. Finally, the logarithm of the spectrogram summary vector is calculated to correlate the fingerprint to decibel units. The fingerprint may optionally be normalized by dividing the fingerprint vector by its median value.

Continuing with the example of FIG. 5, formed ambient fingerprints are stored as part of monitored data 503. It is understood that each element of monitored data (502-506) may be collectively stored in 503, or may be partitioned among multiple storage areas of device 510. In one embodiment, each of the stored monitored data 503 is associated with a time stamp.

During operation, device 510 may be exposed to media via audio 520, or through Internet data 521 that may be received wirelessly or through a wired connection. Audio 520 may be received in device 510 through a microphone, or may also be received through a data connection (e.g., WiFi, Internet). Research data indicating exposure to media is stored in research data 502 and may be correlated with monitored data 503 via processor 501 to produce contextual information regarding the exposed media, which in turn may be additionally processed for compliance purposes, if necessary. As shown in FIG. 5, research data 502 and monitor data 503 are preferably transmitted to storage 522, where additional processing by one or more servers 523 is performed.

The ambient signatures may be used alone for providing contextual information/localization for research data 502, or may preferably be combined with other monitored data to provide a richer data set. In one advantageous embodiment, ambient signatures may be used to supplement location data 504 that is provided by a GPS unit to provide specific identification of a location coordinate. In cases where device 510 includes mapping software, the audio signature may be used to "tag" locations for identification purposes, which in turn can provide an additional element of contextual information regarding research data 502. In another advantageous embodiment, ambient signatures can be used in conjunction with motion data (506) to confirm that an activity involving motion is taking place in a particular location (e.g., basement treadmill, gymnasium, etc.). This information could then be used to correlate research data to that location to determine, for example, that a user was exposed to one radio station in a basement treadmill, while exposure to a second radio station took place at a treadmill located in a gymnasium. Since the accelerometer alone is measuring only motion, it might not provide an accurate contextual reading between the two treadmills, the ambient signature would provide the necessary information to obtain accurate contextual readings.

Figure 6:
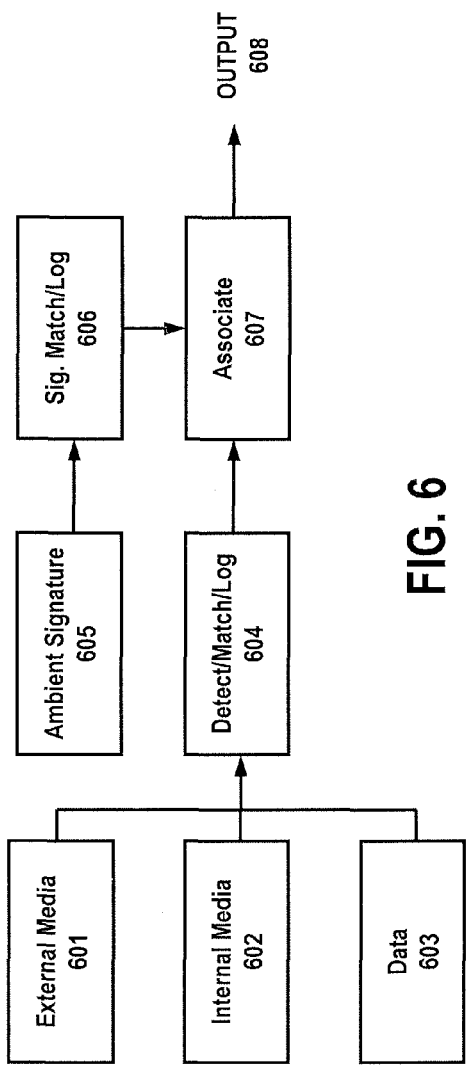
FIG. 6 illustrates an embodiment for correlating ambient fingerprint location to media exposure data.

FIG. 6 illustrates an embodiment where a PUA device collects information regarding media exposure together with ambient signature data to generate a media session output 608. Exposure data relating to external media 601, internal media 602 and data 603 are collected and matched/logged in 604. For the purposes of this embodiment, "external media" refers to media that is generated from a source outside a portable device and is widely accessible, whether over-the-air, or via cable, satellite, network, internetwork (including the Internet), print, displayed, distributed on storage media, or by any other means or technique and that is humanly perceptible, with or without the aid of a machine or device, without regard to the form or content, and including but not limited to audio, video, audio/video, text, images, animations, databases, broadcasts, displays (including but not limited to video displays, posters and billboards), signs, signals, web pages, print media and streaming media data. "Internal media" refers generally to the same media as external media, except that the media is generated within a portable device and may include metadata. "Data" as it is used in reference 603 of FIG. 6 refers to operational data relating to an operating condition and/or status of a portable processing device, such as software applications that are opened/closed, communication status (e.g., WiFi, Bluetooth, wireless on/off) battery power, etc.

In 604, data pertaining external media 501 exposure is detected/matched in step 604. If the external media contains encoded ancillary codes, the media is decoded to detect the presence of the codes and the information pertaining to those codes (e.g., name of show, artist, song title, program, content provider ID, time of broadcast/multicast/narrowcast, etc.). If an audio and/or video signature is made from the incoming media, the signature is formed and stored on the device. Under one embodiment, the signature may be transmitted outside the device via a network to perform matching, where the match result is transmitted back to the portable device. Under an alternate embodiment, the signature may be compared and/or matched on the device itself. Operation-relating data 603 is also logged in 604. The detecting/matching/logging processes in 604 may be performed on a single processor (such as CPU), or may be performed on multiple processors as well. Results of 604 may then be stored in one or more memory devices.

At the same time detecting/matching/logging processes are performed in 604, ambient signature data may be matched and/or logged in process 606 to identify a specific user location determined from any of the techniques described above. The location may then be authenticated by matching the ambient signature data with pre-stored ambient signature data. The ambient signature-related data is then associated 607 with the media data from 604 to generate media exposure reports, exemplified in FIG. 6A. While the present example illustrates ambient signature matching on a PUA, it is understood that the ambient signature matching and association may take place on one or more remote servers. Under a preferred embodiment, the ambient signatures are transmitted to one or more remote servers, where matching and association takes place, in order to preserve memory and processing on a PUA.

Turning to FIG. 6A, an exemplary report is illustrated for user 610 ("1234"), where the type of media 611 and program information 612 is listed along with a start time 513 and end time 514 for the media session. Ambient signatures 615 are collected, along with an authentication result 616 (i.e., if ambient signature matches). Operational data, such as battery life 617, and open application(s) 618 may also be listed.

As can be seen from FIG. 6A, multiple types of media may be recorded and associated with ambient signature data. In this example, during media session 619, user 1234 is registered as listening to "X Show" on radio station WABC between 08:45:32 AM and 08:49:32 AM, while in Room1. The ambient signature matches a stored ambient signature for that location, and is thus listed as authenticated. Media session 620 still shows user 1234 as listening to WABC, but now is listening to the "Y Show" and the ambient signature data indicates the user as being in Room2. Again, the ambient signature matches the stored signature for that room and is thus determined to be an authenticated location. During media session 521, user 1234 is watching the "Z Show" television program on Fox, and has authenticated ambient signature data indicating that the user is in Room3.

During media session 622, the Internet site ("Fox.com") is registered, and that the ambient signature data indicates the user is in Room 4. In addition, media session stores application data 618, indicating that a browser ("Opera Mini") was opened and active during the session. Additional information may further be provided in the report with respect to application plug-ins and other software (e.g., media player) accessed in 618. In the example of session 622, the ambient signature data does not match stored ambient signature, and is not authenticated. The failure to authenticate may happen for a number of reasons, such as the signature not being previously registered, or anomalies in the recorded signature (noise, etc.) are preventing a match. Accordingly, the PUA stores the ambient signature for future comparison and possible association with a new location for the user. If the association cannot subsequently be made, media session 622 may be flagged as "unauthenticated" and may be discounted (e.g., using statistical weighting) or alternately discarded for a media exposure report.

Continuing with FIG. 6A, media session 623 shows that the device has now gone to a new Internet site ("CNN.com"). However, no ambient signature is collected during that time. In one embodiment, media sessions having no signatures are simply stored as such, and are flagged and possibly discounted (e.g., using statistical weighting) or discarded for a media exposure report. By using probabilistic processing, unrecognized locations are preferably compared to recognized locations measured at one or more times before and/or after the unrecognized location. If there is sufficient recognition and authentication in this time period, the anomalous ambient signature and media session is credited to the authenticated user. On the other hand, if there is insufficient recognition and authentication in this time period, the anomalous ambient signature and media session is discounted or discarded. Additionally, the lack of an ambient signature can indicate compliance issues (e.g., device not working, microphone not turned on), which may prompt further communication with the user to correct any defects existing in the PUA.

Figure 7:
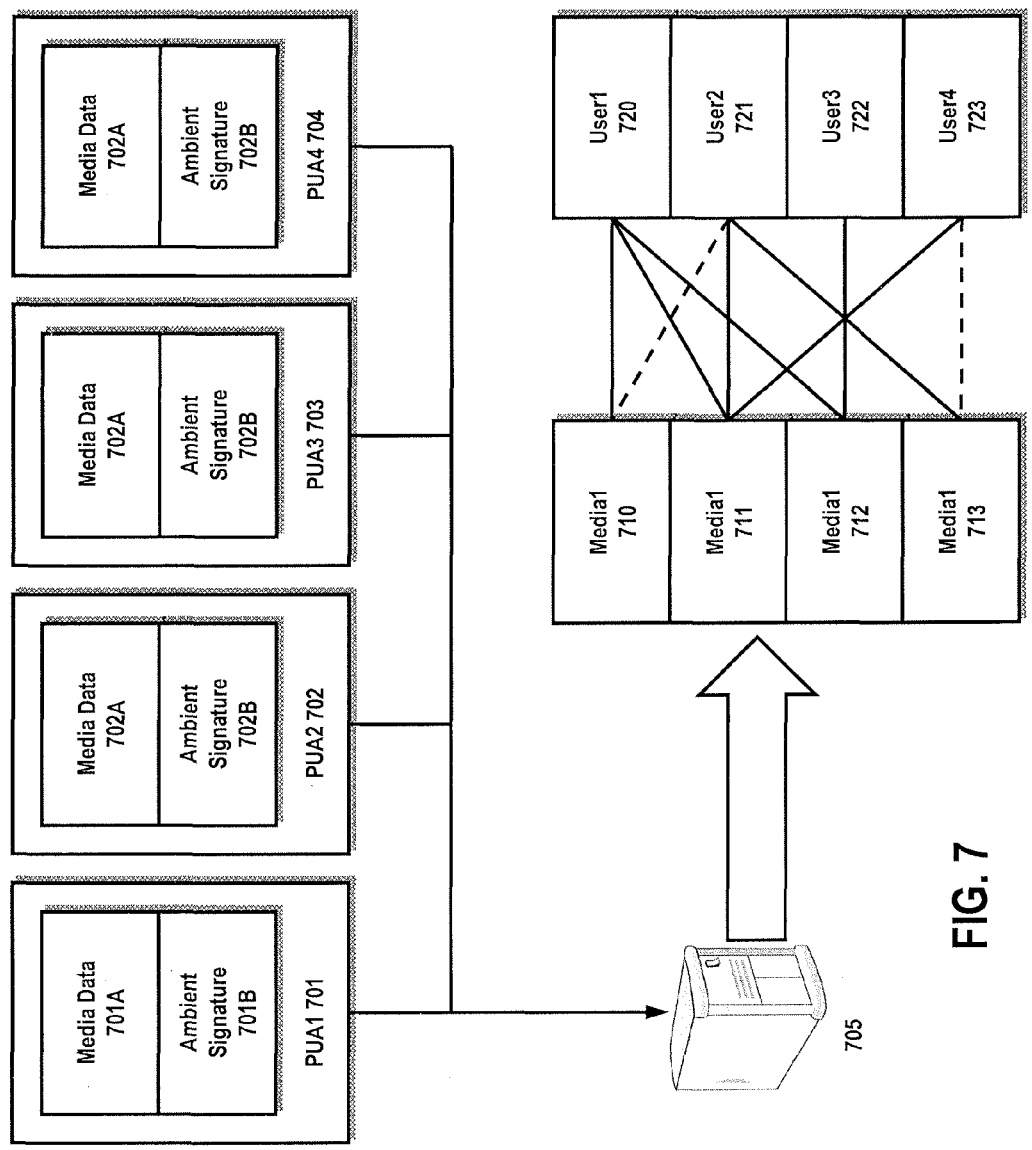
FIG. 7 illustrates an embodiment for determining media exposure credit for multiple users comprising ambient fingerprints.

Turning to FIG. 7, an embodiment is disclosed where media exposure data is received from multiple PUAs 701-704, which in this embodiment are portable processing devices. Each portable processing device generates media data 701A-704A and captures ambient signatures 701B-704B using any of the techniques described above. Each of the devices 701-704 communicates this data using a computer or telephonic network (wired and/or wireless) to server(s) 705. Under one embodiment, media detection, matching and/or logging, ambient signature matching/logging and association are performed on server(s) 705. In another embodiment, these steps are performed on each of the respective portable devices. In yet another embodiment, some of these steps are performed on the devices, while other steps are performed on the server(s) 705.

The processed data in server 705 can be used as a basis for media exposure analysis. In the example of FIG. 7, four media items (710-713) are analyzed as to four users (720-723) that are associated with respective PUAs 701-704. Media items 710-713 may be any of internal and external media described above, along with portable computing device data. Utilizing ambient fingerprint authentication, media exposure can be confirmed for each user. For example, User1 720 would be authenticated as been exposed to Media1 710, Media2 711 and Media3 712. User2 721 would be registered as authenticated with respect to Media2 711 and Media4 713, but unauthenticated with respect to Media1 710. User3 722 would be authenticated with respect to Media3 712, while User4 723 would be registered as authenticated with respect to Media2 711, but unauthenticated with respect to Media4 713.

Turning to FIG. 8, an exemplary table 800 is provided to illustrate how the embodiments described above may also be utilized to determine a probability that one or more of a plurality of users were exposed to a media event 801, such as the serving of a web page, playing of media, and the like. The media event may also be any of the external and/or internal media described above. Turning to FIG. 8, four users (User 1-User 4) are monitored for a specific time period (11:00-11:30). During the time period of 11:10 and 11:15, media event 701 is detected, where Users 1-4 are potential users that may have been exposed to the media event.

In the chart of FIG. 8, ambient fingerprints collected for each user prior to, and after, media event 701. For User 1, the ambient fingerprint data indicates the user was in Room1 from 11:00 to 11:05. From 11:10 to 11:20, User 1is recorded in being in Room4, while from 11:25 to 11:30, no ambient fingerprints were recorded from User1. The monitoring of User 2 via ambient fingerprints establishes that the user was in Room1 between 11:00 and 11:20, then went to Room3 from 11:25-11:30. The monitoring of User3 via ambient fingerprints establishes that the user was in Room2 from 11:00 to 11:05, but then went to Room1 from 11:10 to 11:20. The monitoring of User4 via ambient fingerprints established that the user was in Room2 at 11:00, but no ambient fingerprints were collected from 11:00 to 11:15, at which time user 4 was in Room 3 until 11:20, then moved to Room4 from 11:25 to 11:30.

When media exposure is monitored using any of the techniques described above, the ambient fingerprint locations illustrated in FIG. 8 may be processed concurrently, or separately using time stamps to correlate fingerprint locations with media events. In the example of FIG. 8, a media event 801 is detected to have taken place from 11:10 to 11:15 in Room1. As mentioned previously, the media event could be the display of a web page, playing of media, receiving a broadcast, and the like. Additionally, the location of the media event may be known (e.g., living room television, office computer, etc.). When correlating ambient fingerprint data to media event 801, discreet blocks of time segments are processed to determine fingerprint locations before and after media event 801. In the example of 800, the time blocks immediately preceding (802) and following (803) media event 801 are processed. For Users 1 and 4, it can be seen that the fingerprint locations detected before, during and after media event 801, make them unlikely to have viewed the event. For Users 2 and 3 however, it can be seen that both were in Room1 during event 801. Both may be selected as potential users that were exposed to media event 801.

Under one embodiment, additional processing may be performed to determine user media exposure with a greater degree of accuracy. Ambient fingerprint location time segments may be chained together to determine overall location patterns before, during and after the media event. Looking at User 2, it can be seen that the user was in Room1 throughout the entire period (11:05-11:20). However, User 3 was in Room2 just previous to the event 801. Using logic processing, it can be determined that User2 was the most likely user exposed to the media event, since the location was constant. However, User3 may be credited as being exposed to the media event as well, as it is possible that User3 may have joined User2 in the same room for the media event. Depending on the measurements sought, both may be credited with the media exposure, or User3's media exposure credit could alternately be discounted.

It should be understood that the illustration of FIG. 8 is a simplified example and that other configurations are contemplated in this disclosure. For example, ambient fingerprint location data may be measured in gradations around the media event to determine the most likely user. Here, a first step would determine fingerprint location only within the time period of the media event, and remove users that do not meet predefined criteria (e.g., not located in the room). Next, the fingerprint location data would be processed over a wider time period (e.g., one time segment before/after the media event) for the remaining users and remove users not meeting the criteria. The time periods could then be expanded incrementally (e.g., one time period at a time) until only one user remains. In the case where no users remain, the processing would revert back to the previous time segment and register all the remaining users (which may be 2 or more) as being exposed to the media event. Such processing techniques have the advantageous effect of streamlining the processing needed to accurately determine user media exposure.

In other embodiments, ambient fingerprint data between two or more users can be compared to determine similarities in locations and/or motion. Such similarities may indicate that users were exposed to a media event together. Also, multiple media events can be compared to each other to increase or decrease the probability that a user was exposed to a media event. Of course, as the complexity of analysis increases, techniques such as fuzzy logic and even probabilistic logic may be employed to establish patterns and probabilities under which user media exposure may be identified.

Figure 9:
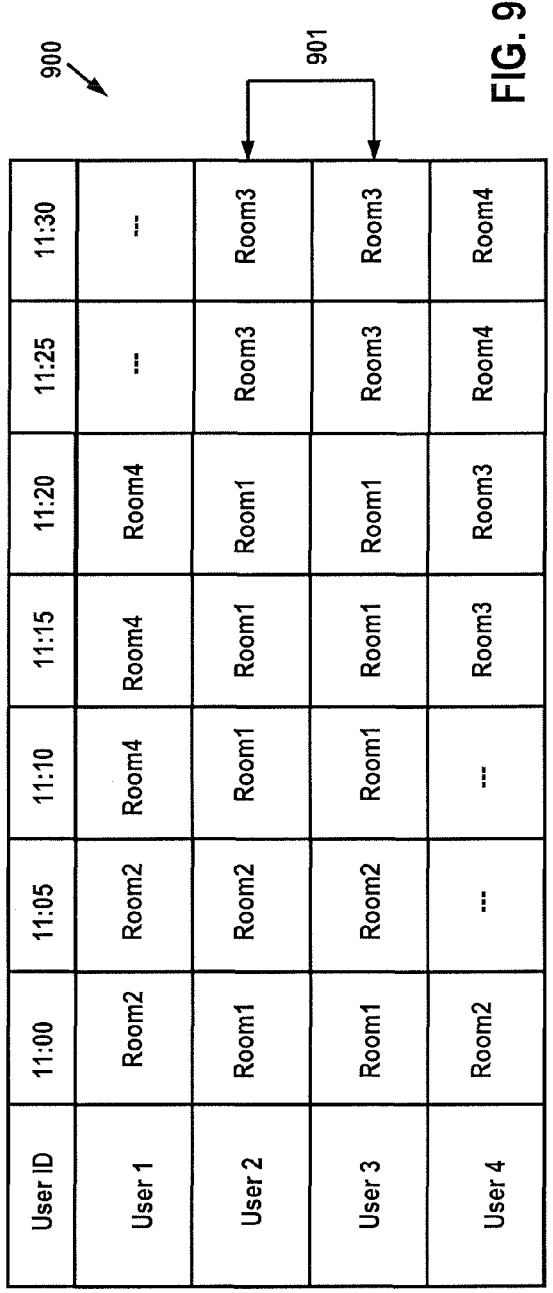
FIG. 9 illustrates an exemplary ambient fingerprint matching result under one embodiment.

Turning to FIG. 9, an exemplary embodiment 900 is disclosed where the ambient fingerprints for the devices of User1-User4 are determined using any of the techniques described above. In this simplified example, ambient fingerprints for each device are collected across a predetermined time period (11:00-11:30) and compared to each other. If successive fingerprints match during that time period (901), this is a strong indication that two devices may be physically possessed by a single user. As such, the devices for those users (User2, User 3) may be flagged as being duplicates. Of course, exact matches are not necessary for such a determination, and match thresholds (e.g., 85%, 90%, etc.) may be used as well.

Figure 9A:
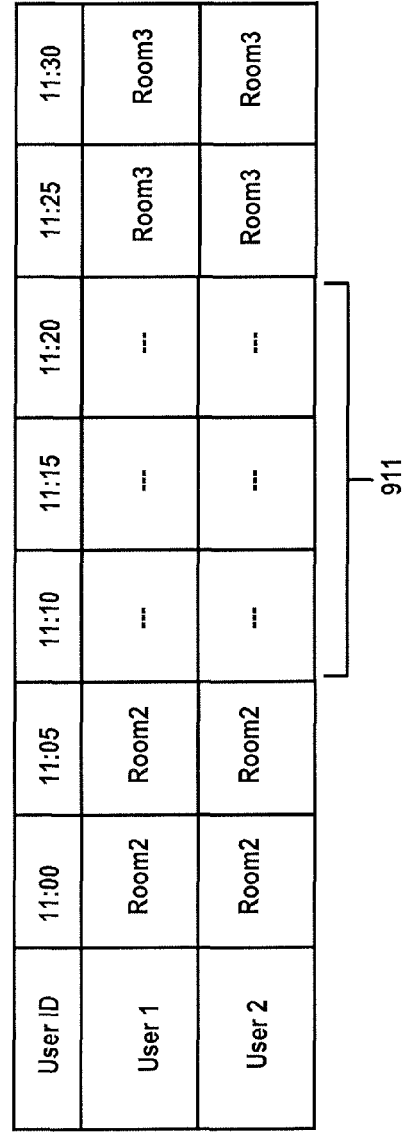
FIG. 9A illustrates another exemplary ambient fingerprint matching result under one embodiment.

Turning to FIG. 9A, a further embodiment 910 is shown where the devices for User 1 and User2 are shown as being substantially the same, except a period of time 911 exists where ambient fingerprints could not be matched to a specific database. This may occur, for example, in areas that were not previously trained or registered in the system, or where extraneous noise is present that prevented an accurate fingerprint reading over an existing database. However, if the devices for the users (User1, User2) are associated as belonging to a group (e.g., family, business, neighborhood, etc.), it may nevertheless be possible to determine if the devices were in the same area. In one embodiment, devices may be associated during a registration process, where users provide to a database information regarding family, friends, associations and the like.

Figure 10:
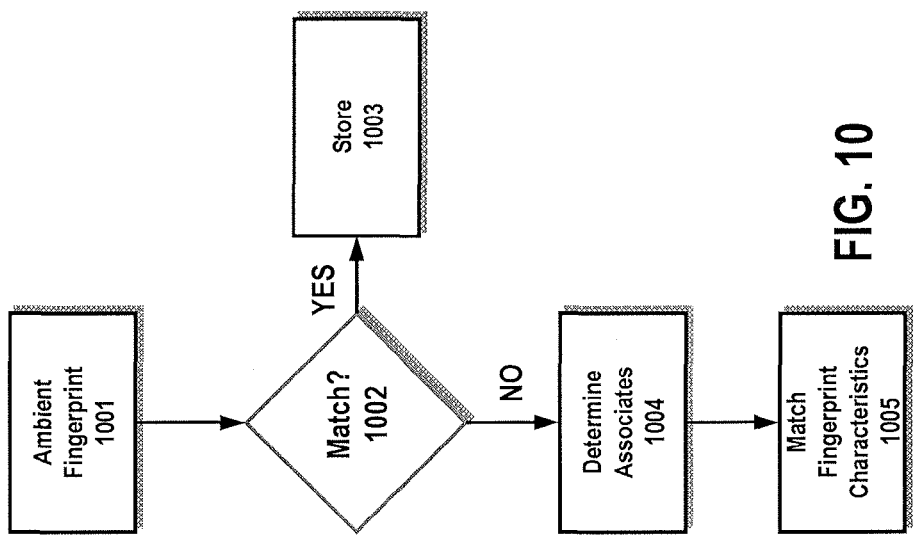
FIG. 10 illustrates an ad-hoc ambient fingerprint matching process for the embodiment of FIG. 9A.

Turning to FIG. 10, a process is disclosed, where an ambient fingerprint is recorded and processed 1001 and subsequently subjected to a matching process 1002. The matching process may occur on the device or at a remote location. If a match is found for the ambient fingerprint, the match is recorded and stored 1003. However, if no match for the ambient fingerprint is found, a determination is made if the device has associations 1004 to other devices in a database. Once associations are determined (e.g., family, friends), any ambient fingerprints recorded in those devices for the given time period are compared against the first fingerprint (1001) to see if the fingerprint characteristics match 1005. This embodiment is particularly advantageous for smaller groups of users, as it allows for ad-hoc fingerprint matching using real-time ambient fingerprint data.

Figure 11A:
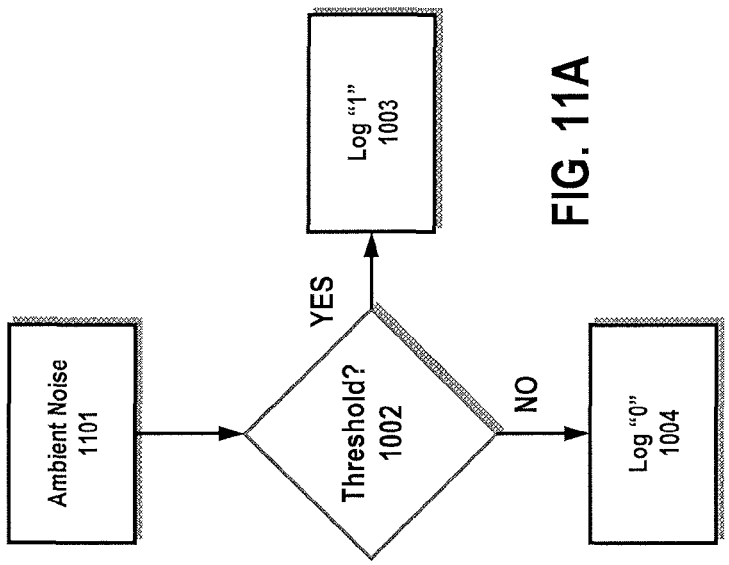
FIG. 11A illustrates another embodiment illustrating an exemplary process for generating time-extended ambient fingerprints.
Figure 11B:
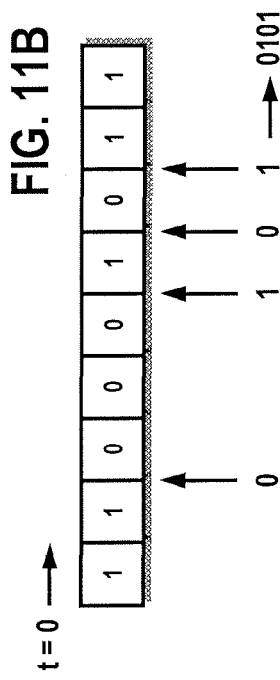
FIG. 11B illustrates embodiments of time-extended ambient fingerprints that may be produced utilizing the exemplary process of FIG. 11A.

FIG. 11A provides yet another exemplary embodiment, where simplified ambient fingerprints are taken for identification purposes. In this example, the fingerprints simply measure the ambient noise 1101 surrounding each device. A determination is then made as to whether or not the noise exceeds a given threshold 1002. If the noise exceeds the threshold, a binary "1" is assigned 1003 for that time period. If the noise does not exceed the threshold, a binary "0" is assigned for that time period. The 1's and 0's for each time period are then collected for a larger predetermined time period (e.g., 1 minute, 10 minutes, 1 hour, etc.) to form a time-extended ambient fingerprint illustrated in FIG. 11B. It is understood by those skilled in the art that other techniques may be used for a time-extended ambient fingerprint. For example, after determining the initial time-extended ambient fingerprint, each transition from a noisy ("1") to non-noisy ("0") environment would generate a first value, while each transition from a non-noisy to noisy environment would generate a second value. In the example of FIG. 11B, it can be seen that the transitions of the binary string provides a transitional time-extended ambient fingerprint of 0101.

In another embodiment, transitional time-extended ambient fingerprints may utilize variable thresholds for each time period. In this embodiment, if the threshold for a first time period is exceeded, the threshold for the second time period is increased by a predetermined amount. If the threshold for the second time period is exceeded, the threshold for the third time period is increased further, and so on. Similarly, thresholds may be reduced for subsequent time periods if the threshold for a present time period is not exceeded. This embodiment may be particularly advantageous for applications in noisy environments, and/or environments containing low-level noise.

In yet another embodiment, multiple thresholds may be used for the ambient noise, and numerical values (e.g., 1, 2, 3, etc.) may be assigned for each threshold. As each threshold is crossed, the numerical value is assigned for each crossing (e.g., "111223113333"). Similar to the example above, noise values transitioning upward may be assigned a "1" and noise values transitioning downward may be assigned a "0" (e.g., "111223113333" would become "1101"). The transitional time-extended ambient fingerprint would be able to capture more extended periods of time, requiring less processing and greater accuracy.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A computer-implemented method for determining portable device presence, comprising:
   receiving media exposure data from a plurality of portable devices at a first input;
   receiving environmental ambient fingerprints from the portable devices at a second input, wherein the environmental ambient fingerprints respectively represent a characteristic of an environment around each of the plurality of portable devices;
   processing the environmental ambient fingerprints in a processor to determine if at least two of the environmental ambient fingerprints match; and
   identifying, via the processor, two or more of the portable devices having matching environmental ambient fingerprints as being in proximity to each other;
   wherein the characteristic includes a level of ambient noise over each of a series of time periods; and
   wherein the environmental ambient fingerprint includes a value for respective ones of the levels of noise and is formed using the values of the series of time periods, and the value for a current one of the levels of noise is dependent upon a determination that a level of noise in each of the series of time periods exceeds a threshold.

2. The computer-implemented method of claim 1, wherein a value of the threshold is either (1) predetermined for the series of time periods, or (2) structured so that the value of the threshold of a subsequent time period in the series of time periods is dependent upon a value of the threshold being exceeded in a preceding time period.

3. The computer-implemented method of claim 1, wherein the environmental ambient fingerprints include one of (1) a histogram of sound recording from the time domain, and (2) a spectral representation of the sound recording.

4. The computer-implemented method of claim 3, wherein the processing of the environmental ambient fingerprints includes comparing a function of the environmental ambient fingerprints to a previously-stored environmental ambient fingerprint.

5. The computer-implemented method of claim 3, wherein the processing of the environmental ambient fingerprints includes comparing a first one of the environmental ambient fingerprints from one of the plurality of portable devices to a second one of the environmental ambient fingerprints from another of the plurality of portable devices.

6. The computer-implemented method of claim 1, wherein the media exposure data includes at least one of (1) codes detected from audio, (2) audio signatures, and (3) Internet data.

7. The computer-implemented method of claim 1, wherein the environmental ambient fingerprints from the portable devices is are correlated to the media exposure data.

8. A system for determining portable device presence, comprising: an input to receive media exposure data from a plurality of portable devices, and to receive environmental ambient fingerprints from the portable devices, the environmental ambient fingerprints representing a characteristic of an environment around respective ones of the portable devices; and a processor, operatively coupled to the input, the processor to process the received environmental ambient fingerprints to determine if at least two of the environmental ambient fingerprints match, the processor to identify corresponding ones of the portable devices having matched environmental ambient fingerprints as located in proximity to one another;
   wherein the characteristic includes a level of ambient noise over each of a series of time periods; and
   wherein the environmental ambient fingerprint includes a value for respective ones of the levels of noise and is formed using the values of the series of time periods, and the value for a current one of the levels of noise is dependent upon a determination that a level of noise in each of the series of time periods exceeds a threshold.

9. The system of claim 8, wherein a value of the threshold is either (1) predetermined for each of time periods, (2) structured so that the value of the threshold for a subsequent time period in the series of time periods is dependent upon the value of the threshold being exceeded in a preceding time period.

10. The system of claim 8, wherein the environmental ambient fingerprints include one of (1) a histogram of sound recording from the time domain, and (2) a spectral representation of the sound recording.

11. The system of claim 10, wherein the processor is to compare the environmental ambient fingerprints to at least one previously-stored environmental ambient fingerprint in a storage, operatively coupled to the processor.

12. The system of claim 10, wherein the processor is to compare a first one of the environmental ambient fingerprints from a first one of the plurality of portable devices to a second one of the environmental ambient fingerprints from another one of the plurality of portable devices.

13. The system of claim 8, wherein the media exposure data includes at least one of (1) codes detected from audio, (2) audio signatures, and (3) Internet data.

14. The system of claim 8, wherein the environmental ambient fingerprints from the portable devices is are correlated to the media exposure data using said processor.

15. A computer readable storage device comprising instructions that, when executed by a processor, cause the processor to at least:
   receive media exposure data from a plurality of portable devices at a first input;
   receive environmental ambient fingerprints from the portable devices at a second input, wherein the environmental ambient fingerprints respectively represent a characteristic of an environment around each of the plurality of portable devices;

process the environmental ambient fingerprints to determine if at least two of the environmental ambient fingerprints match;

identify two or more of the portable devices having matching environmental ambient fingerprints as being in proximity to each other;

wherein the characteristic includes a level of ambient noise over each of a series of time periods; and wherein the environmental ambient fingerprint includes a value for respective ones of the levels of noise and is formed using the values of the series of time periods, and the value for a current one of the levels of noise is dependent upon a determination that a level of noise in each of the series of time periods exceeds a threshold.

16. The computer readable storage device of claim 15, wherein a value of the threshold is either (1) predetermined for the series of time periods, or (2) structured so that the value of the threshold of a subsequent time period in the series of time periods is dependent upon a value of the threshold being exceeded in a preceding time period.

17. The computer readable storage device of claim 15, wherein the environmental ambient fingerprints include one of (1) a histogram of sound recording from the time domain, and (2) a spectral representation of the sound recording.

18. The computer readable storage device of claim 17, wherein the processing of the environmental ambient fingerprints includes comparing a function of the environmental ambient fingerprints to a previously-stored environmental ambient fingerprint.

19. The computer readable storage device of claim 17, wherein the processing of the environmental ambient fingerprints includes comparing a first one of the environmental ambient fingerprints from one of the plurality of portable devices to a second one of the environmental ambient fingerprints from another of the plurality of portable devices.

20. The computer readable storage device of claim 15, wherein the media exposure data includes at least one of (1) codes detected from audio, (2) audio signatures, and (3) Internet data.

* * * * *

UNITED STATES PATENT AND TRADEMARK OFFICE
CERTIFICATE OF CORRECTION

PATENT NO. : 9,332,363 B2  
APPLICATION NO. : 13/728252  
DATED : May 3, 2016  
INVENTOR(S) : Jain et al.

Page 1 of 1

It is certified that error appears in the above-identified patent and that said Letters Patent is hereby corrected as shown below:

In the claims

Column 26, line 9 (Claim 7): Delete the word "is" between "devices" and "are".

Column 26, line 56 (Claim 14): Delete the word "is" between "devices" and "are".

Signed and Sealed this  
Twenty-first Day of June, 2016

Michelle K. Lee  
*Director of the United States Patent and Trademark Office*